US005208316A

United States Patent [19]

Yoshinaga

[11] Patent Number: 5,208,316

[45] Date of Patent: May 4, 1993

[54] CYCLODEXTRIN POLYMER AND CYCLODEXTRIN MEMBRANE PREPARED USING SAID POLYMER

[75] Inventor: Masanobu Yoshinaga, Tokyo, Japan

[73] Assignee: Toppan Printing Co., Ltd., Tokyo, Japan

[21] Appl. No.: 842,157

[22] PCT Filed: Jul. 29, 1991

[86] PCT No.: PCT/JP91/01012

§ 371 Date: Mar. 23, 1992

§ 102(e) Date: Mar. 23, 1992

[87] PCT Pub. No.: WO92/06127

PCT Pub. Date: Apr. 16, 1992

[30] Foreign Application Priority Data

Oct. 1, 1990 [JP] Japan .................................. 2-263581

[51] Int. Cl.[5] .............................................. C08G 18/48

[52] U.S. Cl. ........................................ 528/68; 528/73; 528/272; 528/295; 528/306; 528/308; 528/341; 528/364; 528/370; 528/372; 536/103

[58] Field of Search .................... 528/68, 73, 272, 295, 528/306, 308, 341, 364, 370, 372; 536/103

[56] References Cited

U.S. PATENT DOCUMENTS 4,711,936 12/1987 Shibanai et al. .................... 536/103

*Primary Examiner*—Maurice J. Welsh

*Attorney, Agent, or Firm*—Armstrong, Westerman, Hattori, McLeland & Naughton

[57] ABSTRACT

Provided are a cyclodextrin polymer containing cyclodextrin in the backbone chain of a high-molecular weight compound selected from a polyurethane, a polyurea, an unsaturated polyester, a polyester, a polycarbonate, a polyamide and a polysulfone, as well as a cyclodextrin membrane prepared using said polymer.

In accordance with the present invention, an increased amount of cyclodextrin unit can be immobilized and the function thereof is significantly improved; further, by using a specific high-molecular weight compound, the polymer obtained is rendered insoluble in water, etc. and yet decomposable with enzymes and it can accordingly be used as a degradable polymer. Further, there can be provided a cyclodextrin membrane which contains a large extent of cyclodextrin and which can be used alone as a membrane.

3 Claims, No Drawings

CYCLODEXTRIN POLYMER AND CYCLODEXTRIN MEMBRANE PREPARED USING SAID POLYMER

TECHNICAL FIELD

This invention relates to a polymer containing cyclodextrin and a cyclodextrin membrane prepared using said polymer.

BACKGROUND ART

Cyclodextrin is capable of including various compounds within its tubular cavity and such inclusion compounds can be used as adsorption/separating agents. However, cyclodextrin is soluble not only in water but also in certain organic solvents. It has therefore been difficult for cyclodextrin to include a compound from various types of systems for isolation. Under such circumstances, it has been proposed to use cyclodextrin as an insoluble high-molecular weight compound.

Such approach for using cyclodextrin as a high-molecular weight compound includes: use of a reaction product of chloromethylated polystyrene with a cyclodextrin derivative as described in Japanese Unexamined Published Patent Application Nos. 61290/1979 and 61291/1979; use of an immobilized cyclodextrin amino derivative prepared by reacting an insoluble high-molecular weight substance with a cyclodextrin derivative as described in Japanese Unexamined Published Patent Application No. 227906/1984; and use of cyclodextrin crosslinked with epichlorohydrin to form a high-molecular weight compound wherein the residual hydroxyl groups in cyclodextrin being converted to other functional groups, or cyclodextrin immobilized to the terminal functional groups of a copolymer by polymer reaction, as described in Japanese Unexamined Published Patent Application No. 275102/1987.

However, in the case of immobilizing cyclodextrin on polymers by the polymer reaction, the extent of immobilization is so small that the aforementioned function of cyclodextrin can hardly be expected. The crosslinked product has a three-dimensional network structure, so it is difficult to expect cyclodextrin to retain the ability to make a tubular structure. Further, the conversion of cyclodextrin into an insoluble polymer has been causeing problems such as the waste.

Based on the above-described characteristics of cyclodextrin, an immobilized membrane containing cyclodextrin is expected to have unique separating, permeating and other abilities. Further, the cycodextrin supported on a polymer is expected to have various physical properties that could not been attained by cyclodextrin alone, thereby extending the applicability of cyclodextrin. Hence, there has been a need for a method of easily preparing a membrane containing cyclodextrin.

For the preparation of such cyclodextrin membranes, Japanese Unexamined Published Patent Application No. 232210/1985, discloses a method in which a polymer comprising the crystal of a cycloextrin inclusion compound and a compound containing isocyanate groups is cast onto a commercial ultrafiltration membrane; Japanese Unexamined Published Patent Application No. 258702/1987 discloses a method in which cyclodextrin is reacted with various monomers and thereafter copolymerized with an acrylonitrile derivative to produce a polymer which is then processed into a membrane by known techniques.

However, the method disclosed in Japanese Unexamined Published Patent Application No. 232210/1985 has the disadvantage that the cyclodextrin membrane produced can not be employed as a membrane of the polymer per se, and the method disclosed in Japanese Unexamined Published Patent Application No. 258702/1987 has the disadvantage that the degree of incorporation of cyclodextrin into the polymer membrane is not sufficiently high.

An object, therefore, of the present invention is to provide a cyclodextrin polymer having an increased amount of cyclodextrin unit immobilized to achieve marked improvement in their function.

Another object of the present invention is to provide a cyclodextrin polymer which is insoluble in water, etc. but capable of being decomposed by an enzyme, by using a specific high-molecular weight compound, thereby said cyclodextrin polymer can be used as a degradable polymer.

Still another object of the present invention is to provide a cyclodextrin membrane which contains cyclodextrin in a high proportion and yet can be used alone as a membrane.

DISCLOSURE OF INVENTION

The present inventor conducted intensive studies under the circumstances described above and found that the above-stated objects of the present invention can be attained by providing cyclodextrin polymer containing cyclodextrin in the backbone chain of a high-molecular weight compound selected from a polyurethane, polyurea, an unsaturated polyester, a polyester, a polycarbonate, a polyamide and a polysulfone, as well as a cyclodextrin membrane prepared using said polymer.

The present invention is described below in detail.

Examples of the high-molecular weight compound containing cyclodextrin (abbreviated as "CD", herein after) in the backbone chain are polyurethanes, polyureas, unsaturated polyesters, polyesters, polycarbonates, polyamides and polysulfones.

Examples of the CD derivatives used for synthesizing such high-molecular weight compounds are those having protective groups only in two of the hydroxyl groups in CD as follows:

(1)

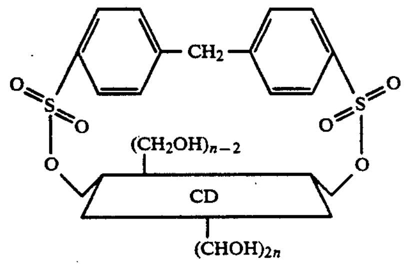

-continued
(2)
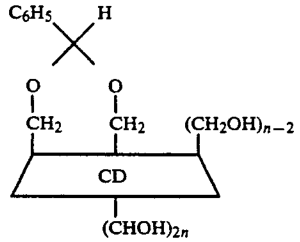
(3)
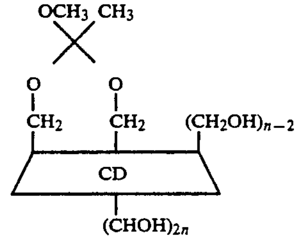
(4)
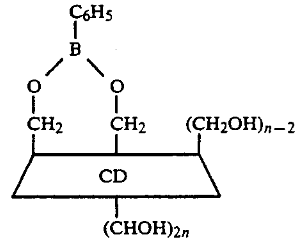
(5)
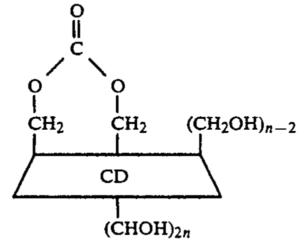
(7)
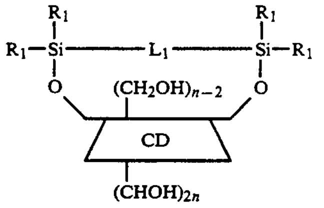
(wherein $L_1$ is —O—, —$CH_2$—, —$C_2H_4$— or
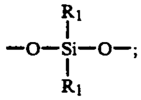
and $R_1$ is $CH_3$—, $C_2H_5$—, i—$C_3H_7$—, or
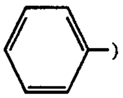
-continued
(8)
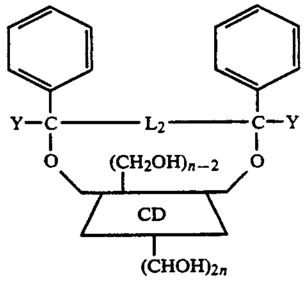
(wherein $L_2$ is —O—, —S—,
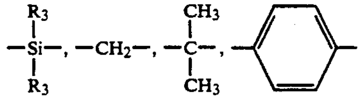
or a single bond; $R_2$ is $CH_3$—, $C_2H_5$—, i—$C_3H_7$,
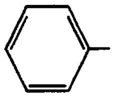
or H—; and Y is Cl, Br or I)
(9)
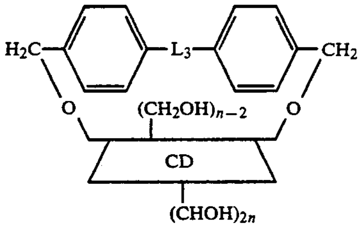
(wherein $L_3$ is —O—, —S—, —$CH_2$—,
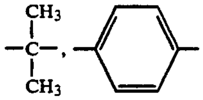
or a single bond;
As concrete examples of the compound (7) above which may be mentioned are as follows:
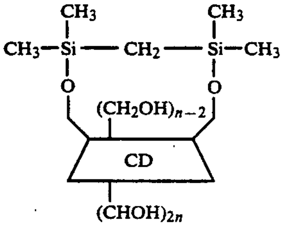

-continued
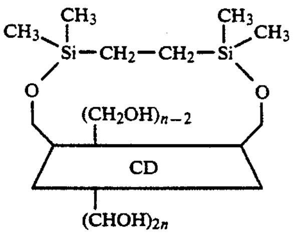
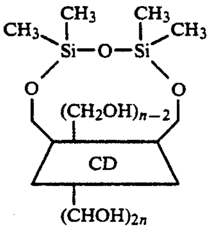
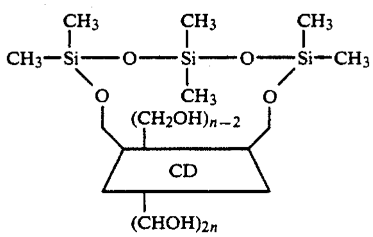
(wherein $CH_3$— bonded to Si may be $C_2H_5$—, i—$C_3H_7$— or
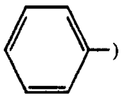
As concrete examples of the compounds (8) and (9) above are as follows:
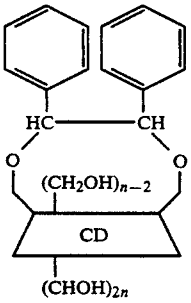
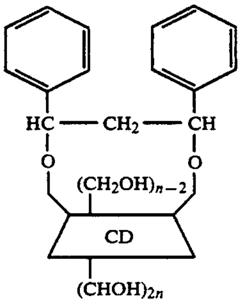
-continued
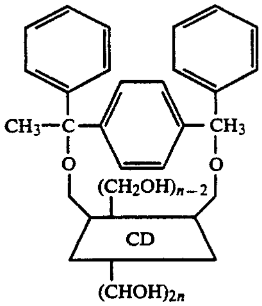
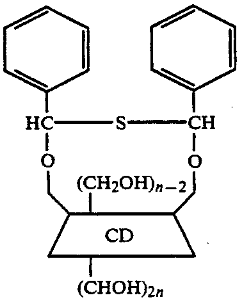
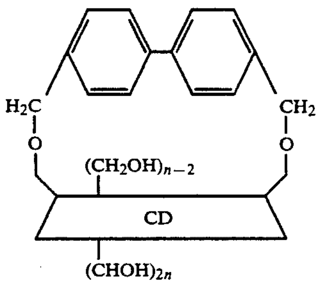
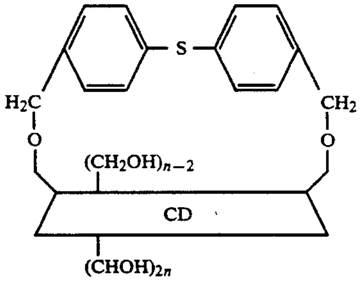
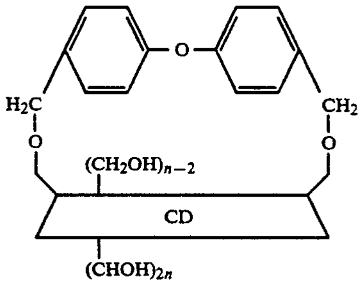
The typical synthesis schemes for the preparation of CD polymers by incorporating CD into the backbone chain of a high-molecular weight compound are as follows:
(1) Synthesis of polyurethane and polyurea

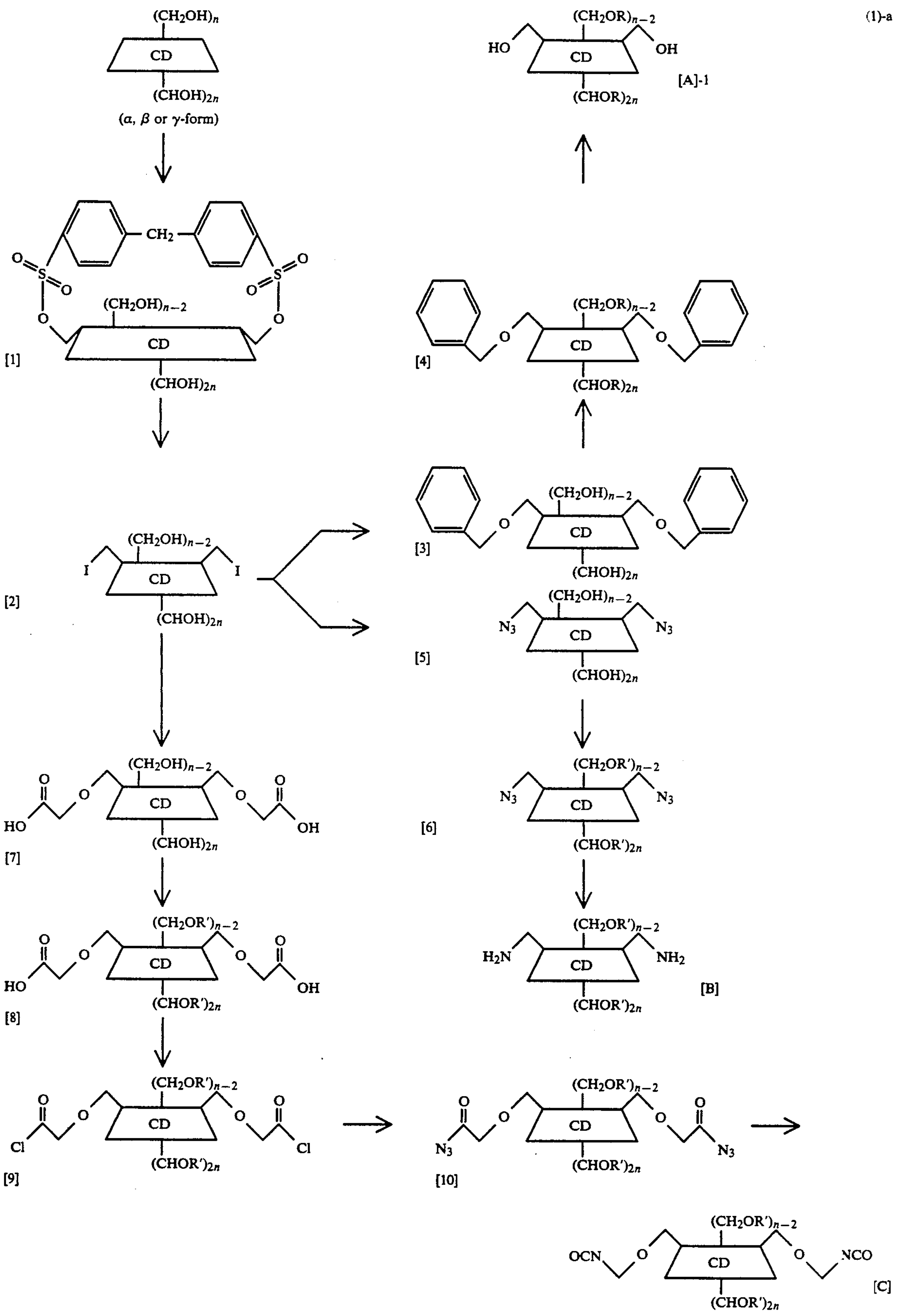
(1)-a
(CH2OH)n
CD
(CHOH)2n
(α, β or γ-form)
[1]
CH2
(CH2OH)n-2
[2]
I
[3]
[4]
(CH2OR)n-2
(CHOR)2n
HO
OH
[A]-1
[5]
N3
[6]
(CH2OR')n-2
(CHOR')2n
H2N
NH2
[B]
[7]
[8]
[9]
Cl
[10]
OCN
NCO
[C]

-continued
(1)-b
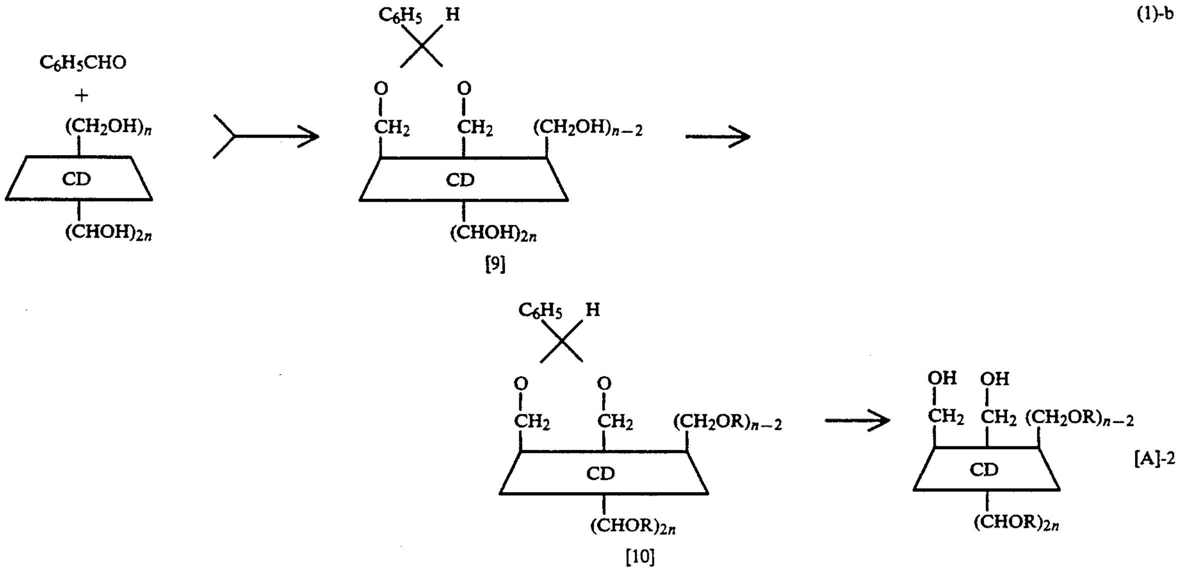
[A]-2
(1)-c
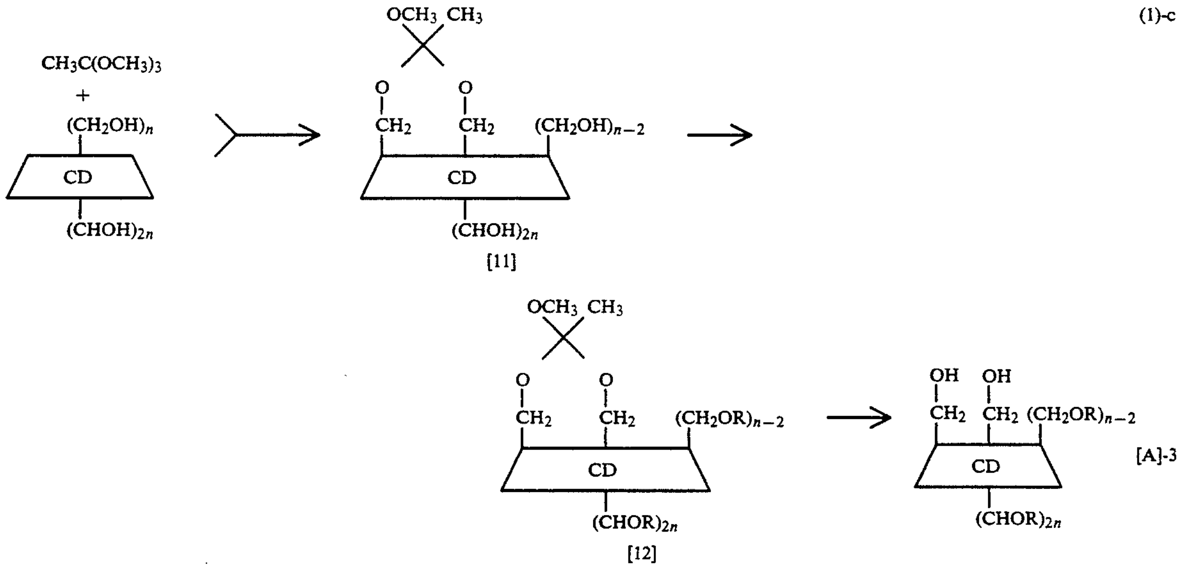
[A]-3
(1)-d
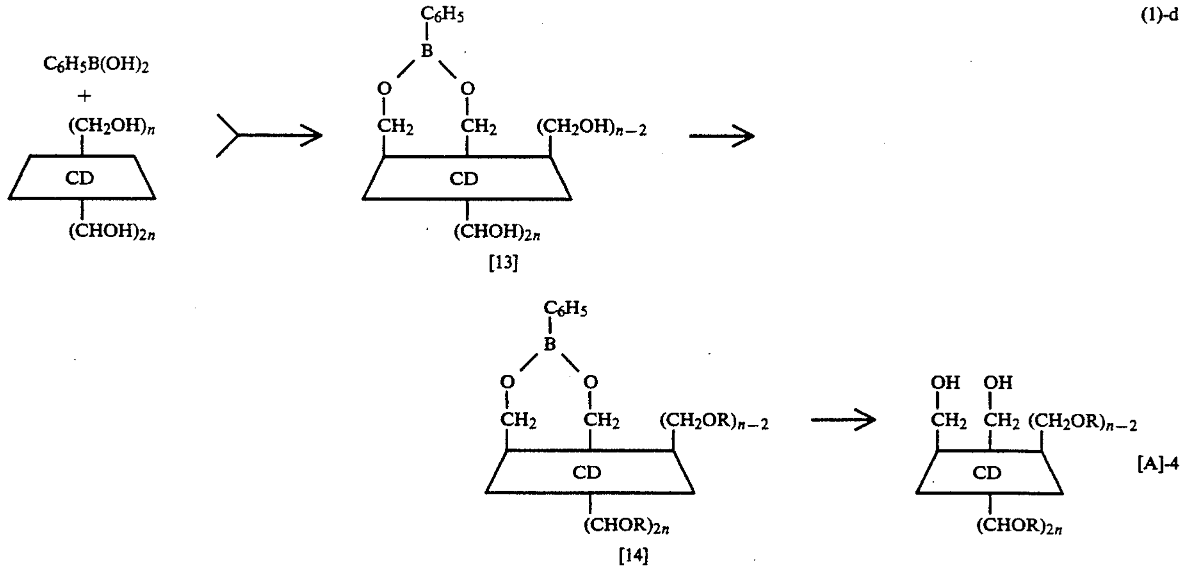
[A]-4

-continued
(1)-e
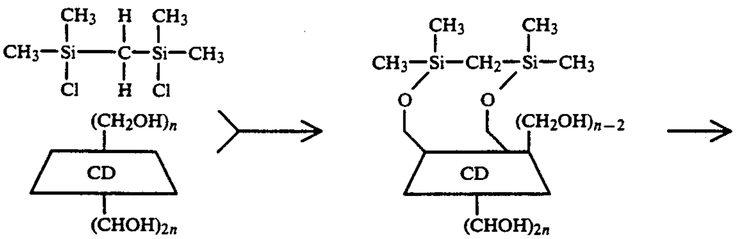
[15]
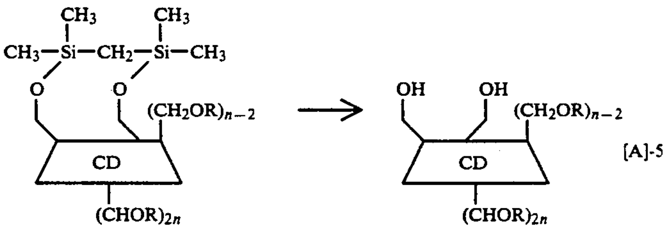
[16]
[A]-5
(1)-f
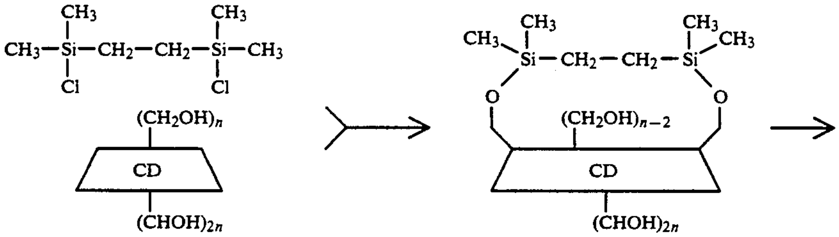
[17]
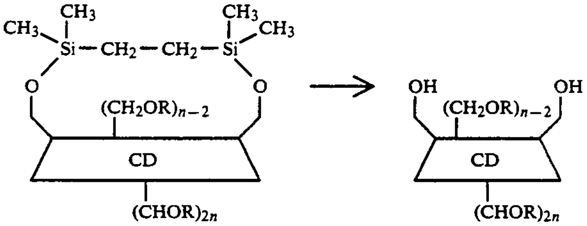
[18]
[A]-6
(1)-g
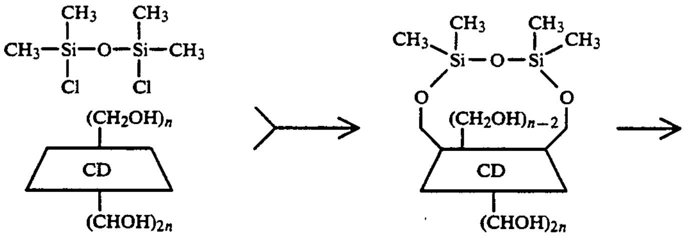
[19]
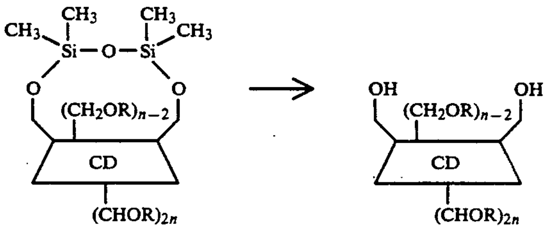
[20]
[A]-7

-continued
(1)-h
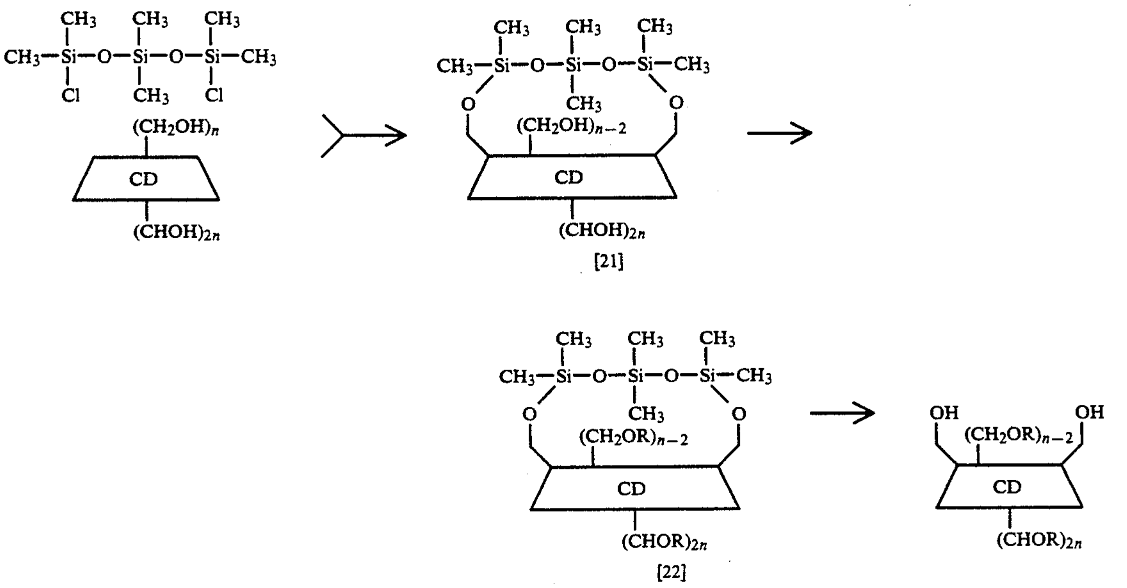
[A]-8
(1)-i
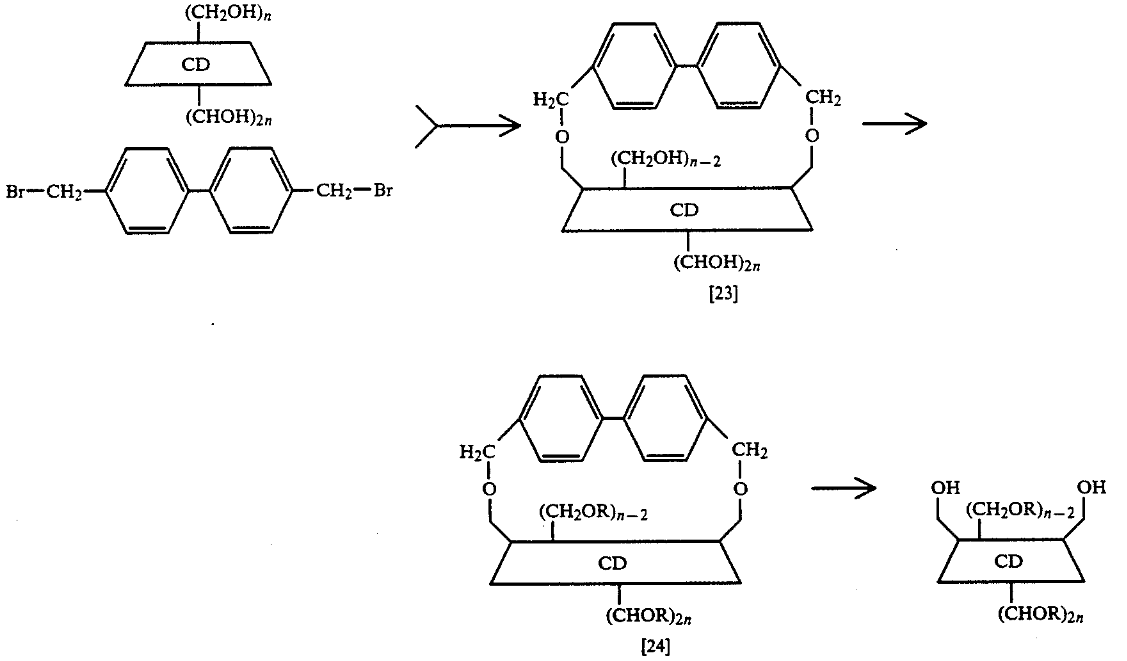
[A]-9
(1)-j
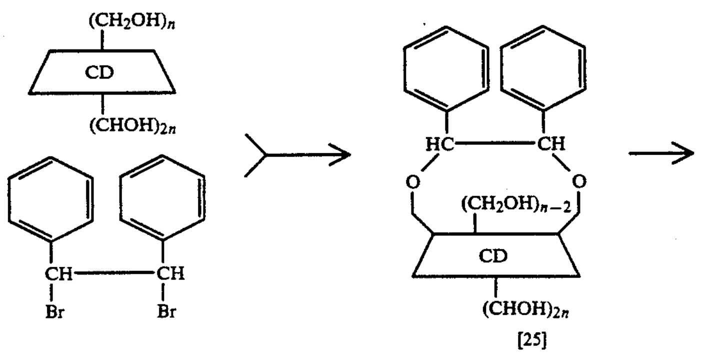

-continued
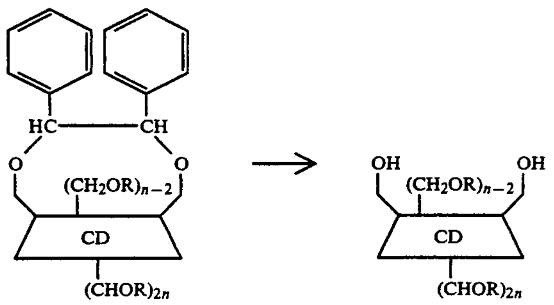
[26]
[A]-10
(1)-k
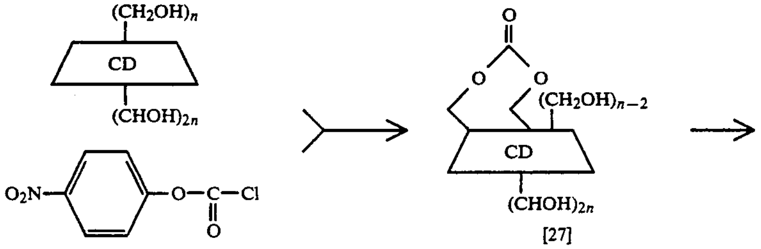
[27]
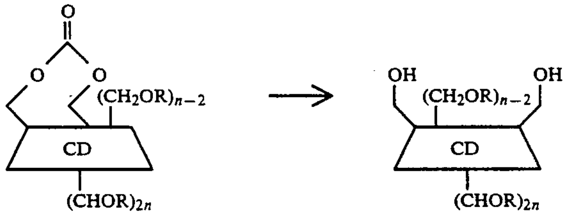
[28]
[A]-11
(1)-l
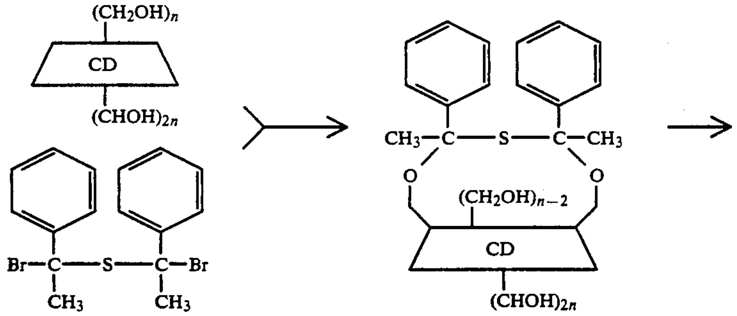
[29]
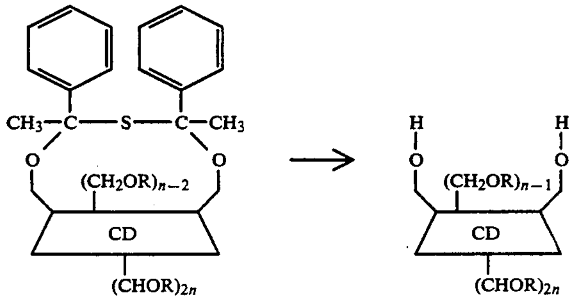
[30]
[A]-12

-continued
(1)-m
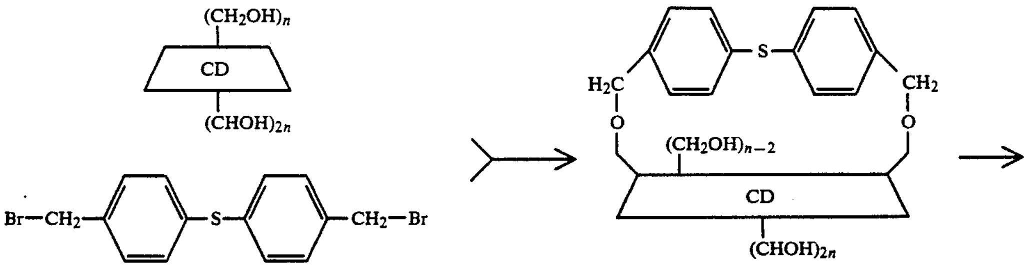
[31]
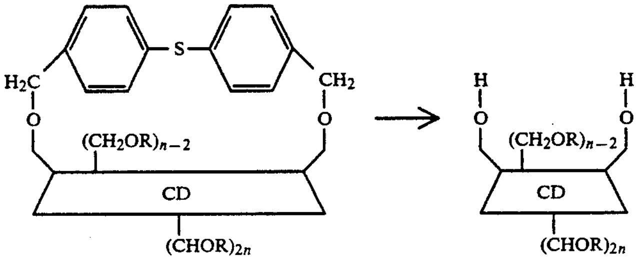
[32] [A]-13
(1)-n
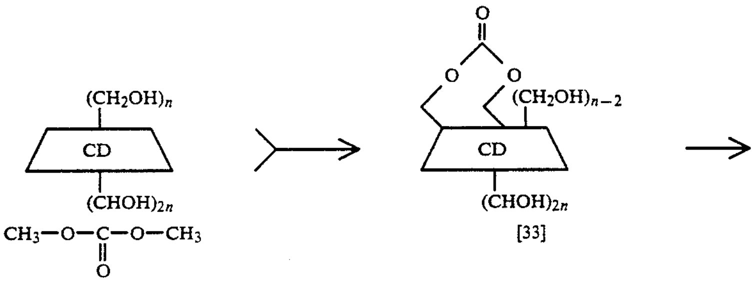
[33]
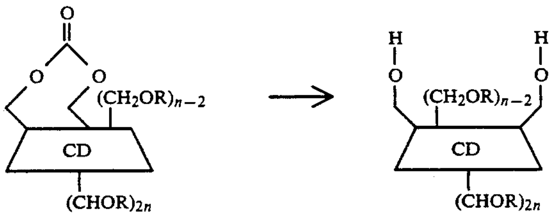
[34] [A]-14
(CD represents cyclodextrin and may be either of α-, β- or γ- form; when α-CD is used, n=6; when β-CD is used, n=7; and when γ-CD is used, n=8)
1.
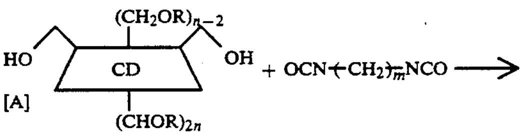
[A]
(α, β or γ —CD)
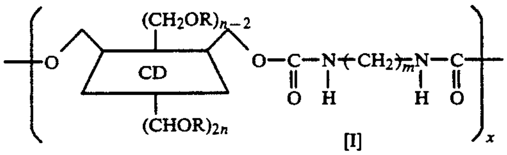
[I]
An aromatic diisocyanate, a CD diisocyanate [C], etc. may also be used as a diisocyanate to be reacted with [A].
2.
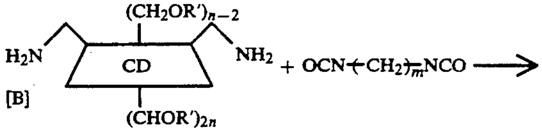
[B]
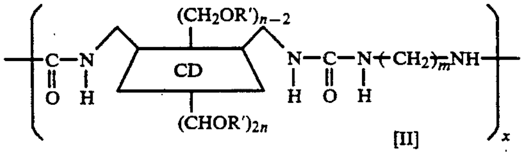
[II]
An aromatic diisocyanate, a CD diisocyanate [C], etc. may also be used as a diisocyanate to be reacted with [B].

3.

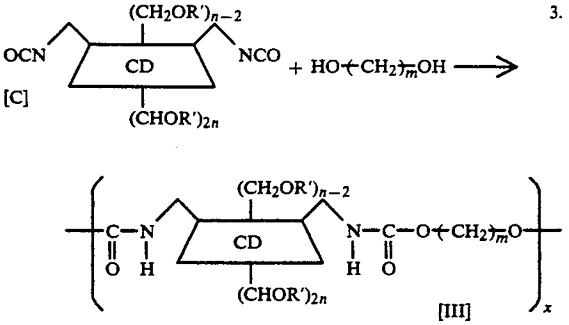

An aromatic glycol, CD glycol [A], etc. may also be as a glycol to be reacted with [C].

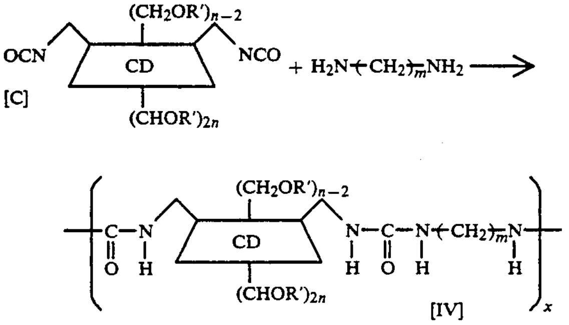

An aromatic diamine, CD diamine [B], etc. may also be used as a diamine to be reacted with [C].

In the reaction schemes shown above, R represents $CH_3$—,

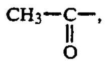

$CH_2$=CH—$CH_2$—, etc.; R' represents $CH_3$—,

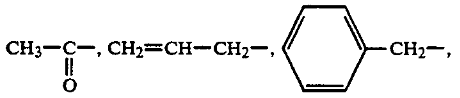

etc.; n is 6 when CD is α-CD, n is 7 when CD is β-CD, and n is 8 when CD is γ-CD; and m represents an integer of 2–10.

The above shown reactions may specifically be carried out in the manner described below. In the reactions shown in (1)-a, (1)-b, (1)-c, (1)-d, (1)-e, (1)-f, (1)-g, (1)-h, (1)-i, (1)-j, (1)-k, (1)-l, (1)-m and (1)-n, residual hydroxyl groups may be protected with either one of $CH_3$—,

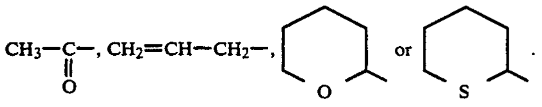

In the reactions shown in (1)-e, (1)-f, (1)-g and (1)-h,

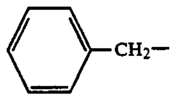

may also be used to protect residual hydroxyl groups in addition to those as mentioned above.

Concrete Examples of Protecting Residual Hydroxyl Groups (A) Introduction of $CH_3$— or $CH_2$=CH—$CH_2$—

A compound having two protected hydroxyl groups is dissolved in anhydrous DMF and the mixture is cooled to 0°–5° C. NaH is added thereto under nitrogen stream. After the addition is complete, the mixture is allowed to react at that temperature for 2 h and thereafter, methyl iodide (with shielding from light) or allyl bromide (without shielding from light) is slowly added dropwise. After the dropwise addition, the mixture is stirred at 0°–5° C. for 2 h, then at room temperature for 24 h. Then, the reaction mixture is filtered and DMF is distilled off under reduced pressure. A small amount of ethanol is added to the residue, followed by reprecipitation from a large amount of water. The precipitate is washed well with water and dried. Thereafter, the dried product is purified by chromatography on a silica gel column to give a compound with the residual hydroxyl groups being protected.

(B) Introduction of

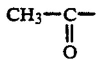

A compound having two protected hydroxyl groups is dissolved in anhydrous pyridine, and acetic anhydride is slowly added dropwise at room temperature. After the dropwise addition is complete, the mixture is allowed to react at 60° C. for 12 h. After the reaction, the mixture is concentrated under reduced pressure to remove pyridine and the residue is reprecipitated from a large amount of ice water. The precipitate is washed well with water and dried. Thereafter, the dried product is purified by chromatography on a silica gel column to afford a compound with the residual hydroxyl groups being protected.

(C) Introduction of

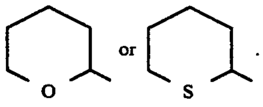

A compound having two protected hydroxyl groups is dissolved in anhydrous DMF, and p-toluenesulfonic acid is added at room temperature. To the resulting mixture, 2,3-dihydro-4H-pyran or 2,3-dihydro-4H-thiine dissolved in DMF is added dropwise. After the dropwise addition, the mixture is allowed to react at room temperature for 24 h and, after the reaction is complete, DMF is distilled off under reduced pressure. A small amount of ethanol is added to the residue followed by reprecipitation from a large amount of water. The precipitate is washed well with water and dried. Thereafter, the dried product is purified by chromatography on an alumina column to afford a compound having the residual hydroxyl groups being protected.

(D) Introduction of

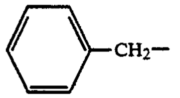

A compound having the residual hydroxyl groups being protected is obtained by repeating the procedure of the reaction [A] except that benzyl bromide is used without shielding from light in place of methyl iodide or allyl bromide.

We now describe the protection of residual hydroxyl groups in (1)-a to (1)-n, and the removal of the protective groups (when R is $CH_3$).

(1)-a

Synthesis of Compound [2] (n=7 and β-CD)

β-CD is dissolved in pyridine at room temperature and to the resulting mixture, diphenylmethane-p,p'-disulfonyl chloride dissolved in pyridine is added dropwise at 5° C. After the dropwise addition, the mixture is stirred for one day at a temperature of 20° C. or below. After the reaction, pyridine is distilled off under reduced pressure with maintaining the temperature at 40° C. or below, and the residue is reprecipitated from a large amount of acetone. The precipitate is collected and purified by repeated recrystallization from water, to give Compound [1] (yield: 15%)

The resultant Compound [1] is stirred with KI in DMF at 70°-80° C. for one day to allow to react, and after completion of the reaction, DMF is distilled off under reduced pressure and the residue is reprecipitated from a large amount of acetone. The precipitate is purified by recrystallization from n-butanol/ethanol/water to give Compound [2].

NaH and benzyl alcohol are reacted in DMF in a nitrogen atmosphere, and a solution of Compound [2] in DMF is added at room temperature. Thereafter, the mixture is allowed to react at 70°-80° C. for one day and, after the reaction is complete, the mixture is filtered. Then, DMF is distilled off under reduced pressure and the residue is reprecipitated from a large amount of acetone. The precipitate is purified by recrystallization from ethanol, thereby Compound [3] (yield: 45%) is obtained.

Compound [3] is dissolved in anhydrous DMF and the mixture is cooled to 0°-5° C. NaH is added thereto under nitrogen stream. After the addition, the mixture is allowed to react at that temperature for 2 h. Then, methyl iodide (with shielding from light) or allyl bromide (without shielding from light) is slowly added dropwise. After completion of the dropwise addition, the mixture is stirred at 0°-5° C. for 2 h, then at room temperature for 24 h. After the reaction, the mixture is filtered and DMF is distilled off under reduced pressure. A small amount of ethanol is added to the residue, followed by reprecipitation from a large amount of water. The precipitate is washed well with water and dried. Thereafter, the dried product is purified by chromatography on a silica gel column to give Compound [4].

Crude Compound [4] is dissolved in ethanol and subjected to hydrogenation with 5% Pd/C. Hydrogenation is continued until no decrease in hydrogen pressure is observed more, then the reaction mixture is filtered and ethanol is distilled off from the filtrate under reduced pressure. The residue is separated and purified by chromatography on a silica gel column to give Compound [A]-1 (di-6-hydroxy-per-0-methyl β-CD) (yield: 30%).

(1)-b

β-CD is dissolved in water and acetic acid is added thereto at room temperature, followed by slow dropwise addition of benzaldehyde. After a little while, crystalls begin to precipitate but the addition is continued and, after the end of the dropwise addition, stirring is continued for farther 6 h. Thereafter, the mixture is filtered and the precipitate is washed with ice-cold water, then with an aqueous sodium hydrogencarbonate solution and dried. The precipitate is purified by repeated recrystallization from water, to give Compound [9] (yield: 45%).

The residual hydroxyl groups in Compound [9] are protected in accordance with the above-described reaction [A], [B] or [C] to give Compound [10].

Compound [10] (e.g. methylation product) is dissolved in acetic acid and subjected to hydrogenation with 5% Pd/C (at room temperature and 5 atm/$cm^2$). Hydrogenation is stopped after no decrease in hydrogen pressure is observed more, Pd/C is removed by filtration, and acetic acid is distilled off under reduced pressure. The residue is separated and purified by chromatography on a silica gel column to give the desired product [A]-2.

(1)-c

β-CD is dissolved in anhydrous DMF, and p-toluenesulfonic acid is added at room temperature. Following stirring at room temperature for 1 h, methyl orthoacetate dissolved in DMF is added dropwise. After the dropwise addition, the temperature of the reaction mixture is raised slowly and the reaction mixture is stirred at 90°-100° C. for 1 h. After the end of the reaction, the mixture is left to cool to room temperature, followed by neutralization and filtration. DMF and trimethyl orthoacetate are distilled off under reduced pressure, and the residue is reprecipitated with a large amount of acetone and filtered. The precipitate is washed well with water and purified by recrystallization from methanol to afford Compound [11].

The protection of residual hydroxyl groups in Compound [11] is conducted as in (1)-b, above whereby Compound [12] can be obtained.

Compound [12] (e.g. acetylated product) is dissolved in acetic acid and the resultant mixture is allowed to react at 50°-60° C. for 12 h. After the reaction, acetic acid is distilled off under reduced pressure.

The residue is separated and purified by chromatography on a silica gel column to afford the desired product [A]-3.

(1)-d

β-CD is dissolved in water and the mixture is held at 30°-40° C. To the mixture, a solution of phenylboric acid in methanol is slowly added dropwise. After a little while, crystallization begins but the addition is continued and, after the end of the dropwise addition, the mixture is stirred for 1 h. After completion of the reaction, the mixture is left to cool and filtered. The precipitate is washed with water and methanol, followed by drying. The precipitate is purified by recrystallization from methanol to give Compound [13] (yield: 60%).

The protection of the residual hydroxyl groups in Compound [13] is conducted as in (1)-b, whereby Compound [14] can be obtained.

Compound [14] (e.g. allylated product) is dissolved in acetone and 1,3-propanediol is slowly added dropwise at room temperature. After the dropwise addition, the mixture is allowed to react at 40°-50° C. for 12 h. After the reaction is complete, acetone is distilled off under reduced pressure and the residue is extracted with a chloroform/water. The chloroform layer is dried, thereafter concentrated under reduced pressure. The residue is separated and purified by chromatography on a silica gel column to give the desired product [A]-4.

(1)-e

β-CD is dissolved in anhydrous pyridine and cooled to 0°-5° C. To the mixture, 1,1,4,4-tetramethyl-1,4-dichlorodisylmethylene dissolved in pyridine is slowly added dropwise. After the end of the dropwise addition, the mixture is stirred at 0°-5° C. for 1 h, then at room temperature for 3 h. After the reaction is complete, the pyridine solution is poured into water and stirred well. The precipitate is washed well with cold methanol and purified by recrystallization from ethanol then from methanol to afford Compound [15] (yield: 30%).

The protection of the residual hydroxyl groups in Compound [15] is performed as in (A), (B), (C) or (D) in the above-described reaction of (1)-a, whereby Compound [16] can be obtained.

Compound [16] (e.g. methylated product) is dissolved in methylene chloride and, to the resulting mixture, 47% boron trifluoride solution in ether is slowly added dropwise. After the end of the dropwise addition, the mixture is stirred at room temperature for 6 h and, after the reaction is complete, the mixture is poured into ice-cold water. The organic layer is separated and washed with aqueous sodium carbonate solution and water, dried and concentrated under reduced pressure. The residue is separated by silica gel chromatography to give the desired product [A]-5.

(1)-f

β-CD is dissolved in anhydrous pyridine and the mixture is cooled to 0°-5° C. To the mixture, 1,1,4,4-tetramethyl-1,4-dichlorodisylethylene dissolved in pyridine is slowly added dropwise. After the end of the dropwise addition, the mixture is stirred at 0°-5° C. for 1 h, then at room temperature for 3 h. After the reaction is complete, the pyridine solution is poured into water and stirred well. The resulting precipitate is washed well with cold methanol and purified by repeated recrystallization from ethanol to afford Compound [17] (yield: 25%).

The protection of the residual hydroxyl groups in Compound [17] is conducted as in (1)-e, whereby compound [18] can be obtained.

The subsequent procedure is conducted in the same way as in the reaction for Compound [16] in (1)-e, whereby the desired product [A]-6 is obtained.

(1)-g

Compound [19] is obtained by repeating the reaction of (1)-f except that 1,1,4,4-tetramethyl-1,4-dichlorodisilethylene is replaced by 1,3-dichlorotetramethyldisiloxane (yield: 25%).

The protection of the residual hydroxyl groups in Compound [19] is performed as in (1)-e, whereby Compound [20] can be obtained.

The subsequent procedure is conducted in the same way as in the reaction for Compound [16] in (1)-e, whereby the desired Compound [A]-7 is obtained.

(1)-h

Compound [21] is obtained by repeating the reaction (1)-f except that 1,1,4,4-tetramethyl-1,4-dichlorodisilethylene is replaced by 1,1,3,3,5,5-hexamethyl-1,5,-dichlorotrisiloxane and that isopropyl alcohol is used as a recrystallization solvent (yield: 30%).

The protection of the residual hydroxyl groups in Compound [21] is conducted as in (1)-e, whereby Compound [22] can be obtained.

The subsequent procedure is conducted in the same way as in the reaction for Compound [16] in (1)-e, whereby the desired product [A]-8 is obtained.

(1)-i

β-CD is dissolved in anhydrous DMSO (or DMF) and two volumes of NaH are added at room temperature under nitrogen stream. After the addition, the mixture is stirred at 40°-50° C. for 30 min and filtered. To the filtrate, 2,2'-bis(bromomethyl)-1,1'-biphenyl dissolved in DMSO (or DMF) is added dropwise at 40°-50° C. and, after the addition, the mixture is stirred at 80° C. for 24 h. After completion of the reaction, the mixture is filtered and the solvent is removed by distillation, and the residue is reprecipitated from a large volume of acetone. The precipitate is washed with water then with acetone and, after drying, the precipitate is purified by recrystallization from ethanol to give Compound [23] (yield: 20%).

The protection of the residual hydroxyl groups in Compound [23] is conducted as in (1)-b, whereby Compound [24] can be obtained.

Compound [24] (e.g. methylated product) is dissolved in acetic acid and subjected to hydrogenation using 10% Pd/C (60° C., 5 atm/cm$^2$). The reaction is continued until no decrease the hydrogen pressure can be observed more and, after the and of the reaction, Pd/C is removed by filtration and acetic acid is distilled off under reduced pressure. The residue is separated and purified by chromatography on a silica gel column to give the desired Compound [A]-9.

(1)-j

Compound [25] is obtained by repeating the reaction (1)-i except that 2,2'-bis(bromomethyl)-1,1'-biphenyl is replaced by 1,2-dibromo-1,2-diphenylethane (yield: 15%).

(i) The protection of the residual hydroxyl groups in Compound [25] is conducted as in (1)-b, thereby Compound [26] can be obtained.

(ii) Compound [25] is dissolved in anhydrous DMF and p-toluenesulfonic acid is added at room temperature. To the resulting mixture, 2,3-dihydro-4H-pyran or 2,3-dihydro-4H-thiine dissolved in DMF is added dropwise. After the end of the dropwise addition, the mixture is allowed to react at room temperature for 24 h and, after completion of the reaction, DMF is distilled off under reduced pressure. A small amount of ethanol is added to the residue and reprecipitation from a large volume of water is performed. The precipitate is washed well with water and dried. Thereafter, the dried precipitate is purified by alumina column chromatography to give Compound [26].

The subsequent procedure is carried out as in the reaction for Compound [24] in (1)-i. whereby the desired product [A]-10 is obtained (1)-k β-CD is dissolved in anhydrous pyridine and cooled to 0°-5° C. To the cooled mixture, p-nitrophenyl chloroformate dissolved in pyridine is slowly added dropwise. After the end of the dropwise addition, the mixture is stirred at room temperature for 24 h. After the reaction is complete, the residue is reprecipitated with a large volume of acetone. The precipitate is filtered, washed well with water and dried. The precipitate is recrystallized from isopropyl alcohol to give Compound [27] (yield: ca. 15%).

The residual hydroxyl groups in compound [27] are protected as in (1)-b, whereby Compound [28] can be obtained.

Compound [28] (e.g. tetrahydropyranylated product) is dissolved in dioxane. To the resulting mixture, an aqueous solution of 0.5M NaOH-50% dioxane is added dropwise. After the end of the dropwise addition, the mixture is stirred at room temperature for 3 h. After the reaction is complete, dioxane is distilled off under reduced pressure and, before crystallization begins, the mixture is passed through a cation-exchange column, and the solvent is distilled again. The residue is extracted using chloroform/water system and the chloroform layer is dried, followed by concentration under reduced pressure. The residue is separated and purified by chromatography on an alumina column to give the desired Compound [A]-11.

(1)-l

β-CD is dissolved in anhydrous DMSO (or DMF) and two volumes of NaH are added at room temperature under nitrogen stream. After the addition, the mixture is stirred at 40°-50° C. for 30 min and filtered. To the filtrate, di(bromophenylethyl)sulfide dissolved in DMSO (or DMF) is added dropwise with maintaining the temperature at 10° C. or below, under nitrogen stream, and after the addition, the mixture is allowed to react with stirring in that atmosphere at room temperature for 60 h.

After completion of the reaction, the mixture is filtered and the solvent is then distilled off under reduced pressure at 30° C. or below, and the residue is reprecipitated with a large volume of diethyl ether. The precipitate is washed with acetone, then washed repeately with water and dried, followed by purification by recrystallization from ethanol to give Compound [29].

Then, Compound [29] is treated in the same way as in protecting residual hydroxyl groups in (1)-b, whereby Compound [30] can be obtained.

The subsequent procedure is conducted in the same way as in the removal of the protective groups in (1)-j, whereby the desired Compound [A]-12 can be obtained. (1)-m Compound [31] is obtained by repeating the procedure of (1)-l except that di-(bromophenylethyl)sulfide is replaced by p,p'-dibromomethyl-diphenyl sulfide.

Then, Compound [31] is treated as in (1)-b for protecting residual hydroxyl groups, whereby Compound [32] can be obtained.

The removal of the protective groups in Compound [32] is performed as in 1-i, whereby the desired Compound [A]-13 can be obtained.

(1)-n

β-CD is dissolved in anhydrous DMF and reacted with NaH under nitrogen stream. The resulting mixture is cooled to 0°-5° C. and a solution of dimethyl carbonate in DMF is slowly added dropwise. After the dropwise addition, stirring is continued at 0°-5° C. for 2 h. After completion of the reaction, the unreacted NaH is reacted with methanol to convert it into an alcoholate, and the solvent is distilled off under reduced pressure at 30° C. The residue is reprecipitated with a large volume of acetone. The precipitate is filtered, washed well with water and dried. The precipitate is purified using isopropyl alcohol to give Compound [33].

Then, Compound [33] is treated in the same way as in (1)-b, for protecting residual hydroxyl groups, whereby Compound [34] can be obtained.

Compound [34] is deprotected as in 1-k, whereby the desired Compound [A]-14 can be obtained.

iii) Synthesis of Compound [B]

$$(R': CH_3-\underset{\underset{O}{\|}}{C}-)$$

Sodium azide is dissolved in DMF and a solution of compound [2] in DMF is added at room temperature. After the addition, reaction is allowed to continue at 80°-90° C. for 6 h. After the reaction is complete, the mixture is left standing to cool to room temperature and filtered, DMF is distilled off under reduced pressure, and the residue is reprecipitated from a large volume of methanol. The precipitate is collected and recrystallized from water to give Compound [5] (yield: 80%).

The Compound [5] thus obtained is dissolved in pyridine and acetic anhydride is added at room temperature. The mixture is stirred for 30 h. After the reaction, pyridine and acetic anhydride are distilled off under reduced pressure and the residue is dissolved in a small amount of ethanol, followed by reprecipitation from a large volume of ice-cold water. The precipitate is washed well with ice-cold water and dried to give Compound [6].

Crude Compound (6) is dissolved in ethanol and subjected to hydrogenation using 10% Pd/C. Hydrogenation is continued until no decrease in the hydrogen pressure is observed more and, after the reduction, the mixture is filtered, ethanol is distilled off under reduced pressure, and the residue is separated and purified by chromatography on silica gel to give Compound [B] (di-6-amino-per-0-acetyl β-CD) (yield: 60%).

iv) Synthesis of Compound [C] (R' is $CH_2{=}CH{-}CH_2{-}$)

Glycolic acid is reacted with NaH in DMF under nitrogen atmosphere and, to the resulting mixture, a solution of Compound [2] in DMF is added at room temperature. After the addition, reaction is continued at 70°-80° C. for one day and, after the reaction, DMF is distilled off under reduced pressure. The residue is reprecipitated from a large volume of acetone. The precipitate purified by recrystallization from methanol to give Compound [7] (yield: 25%).

The resulting Compound [7] is dissolved in DMF, and NaH is added at 0° C. under nitrogen atmosphere. After the addition, the mixture is stirred at 0° C. for 1 h, then at room temperature for 2 h, and cooled again to 0° C. at which temperature allyl bromide is added, followed by stirring at room temperature for one day.

After the end of this period, the mixture is filtered and DMF is distilled off under reduced pressure. Small amount of ethanol is added to the residue, followed by reprecipitation from a large volume of water. The precipitate is washed well with water, and purified by recrystallization from benzene/ethyl acetate to give Compound [8] (yield: 65%).

Then, Compound [8] is dissolved in tetrahydrofuran (THF) and to the resultant mixture, thionyl chloride is added. After the addition, the mixture is allowed to react under reflux for 6 h. After the reaction, the mixture is left standing to cool, and THF and thionyl chloride are distilled off under reduced pressure to dryness to give Compound [9].

Separately, sodium azide is dissolved in water and cooled with ice. To this solution, an acetone solution of Compound [9] is added at 10°-15° C. After the addition, the mixture is stirred at that temperature for further 2 h, then left standing to room temperature. The layers are separated whereby an acetone solution of Compound [10] is obtained.

The resulting solution of Compound [10] is slowly poured into hot benzene of 60°-70° C. and stirred for 2 h. After the reaction is complete, the mixture is filtered and acetone/benzene are distilled off under reduced pressure and dried to give Compound [C] (di-6-isocyanato-per-0-allyl β-CD) (crude yield: 50%).

The synthesis (polyaddition) of CD polymer is performed as follows.

1. Either one of compounds [A]-1 to [A]-11 (n=7, R: $CH_3$—) is dissolved in chlorobenzene (or anisole) and the mixture is stirred in a nitrogen atmosphere. To the resulting mixture, hexamethylene diisocyanate (m=6) dissolved in chlorobenzene (or anisole) is added dropwise under feflux. After the addition of about one half, the mixture is allowed to react for 4-5 h. Thereafter, the remaining half is added dropwise and the reaction is continued for another 2-3 h. After the reaction, the mixture is left standing to cool and the precipitated polymer is dissolved in a small amount of DMF, followed by reprecipitation with a large volume of methanol. The precipitate is collected, washed well with methanol and vacuum-dried afford polyurethane (I).

2. Compound [B] (n=7, R':

$$CH_3-\underset{\underset{O}{\|}}{C}-)$$

is dissolved in anisole and ca. 80% of the total amount of hexamethylene diisocyanate (m=6) dissolved in anisole is slowly added dropwise under cooling with ice. Immediately after the addition, Polyurea [II] crystallizes out. After the end of the dropwise addition, reaction is continued at 70°-80° C. for 1 h and, subsequently, the remaining 20% of the diisocyanate solution is added and reaction is continued at 90°-100° C. for 6 h. After the end of the reaction, the mixture is filtered and the precipitate is washed well with methanol. The low-molecular weight oligomer is extracted with hot ethanol using Soxhlet's extractor. The remaining polymer is vacuum-dried to give polyurea [II].

3. Compound [C] (n=7, R': $CH_2$=CH—$CH_2$—) may be reacted with hexamethylene glycol (m=6) in accordance with Synthesis Example 1, and Compound [C] may be reacted with hexamethylenediamine (m=6) in accordance with Reaction Example 2.

(2) Synthesis of Unsaturated Polyester

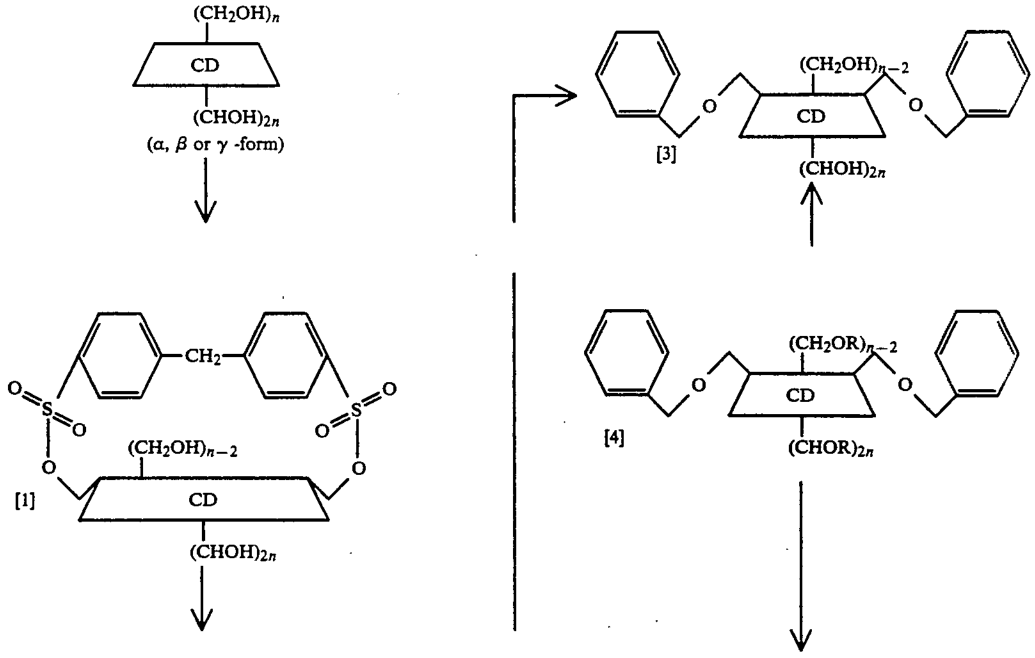

-continued
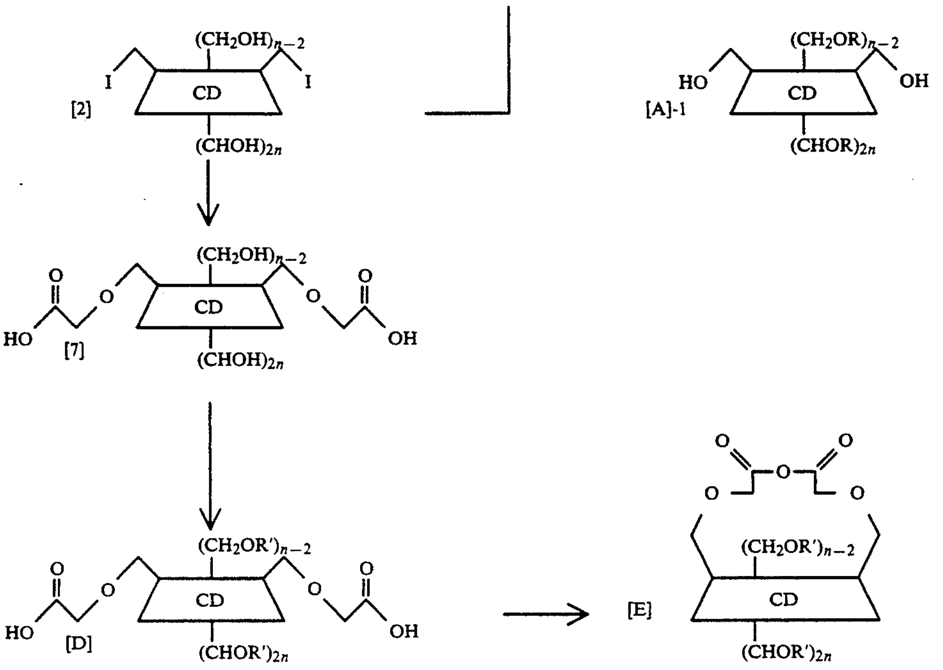
1.
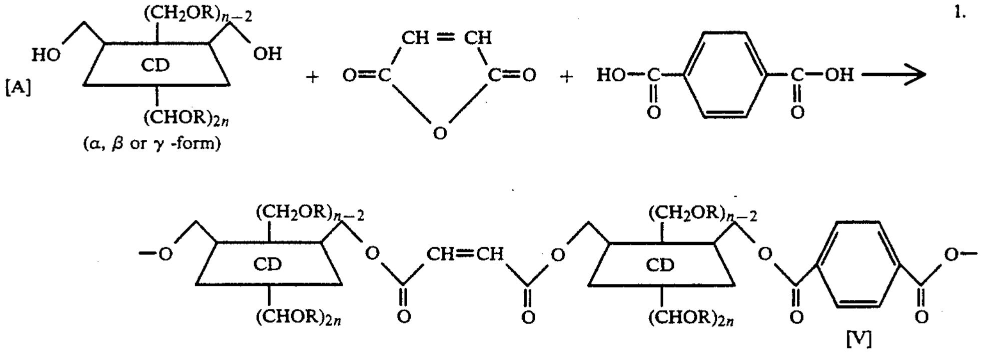
[E] or [D] may also be used as an acid anhydride or as a dicarboxylic acid to be reacted with [A].
2.
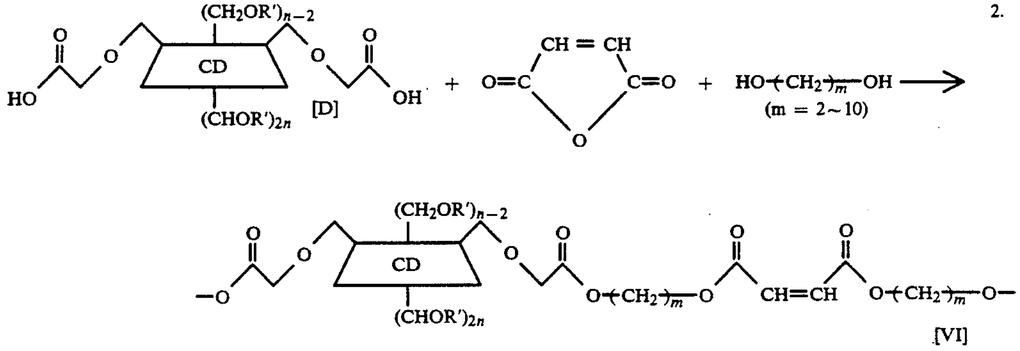
[E] or [A] may also be used as an acid anhydride or as a glycol to be reacted with [D].

3.
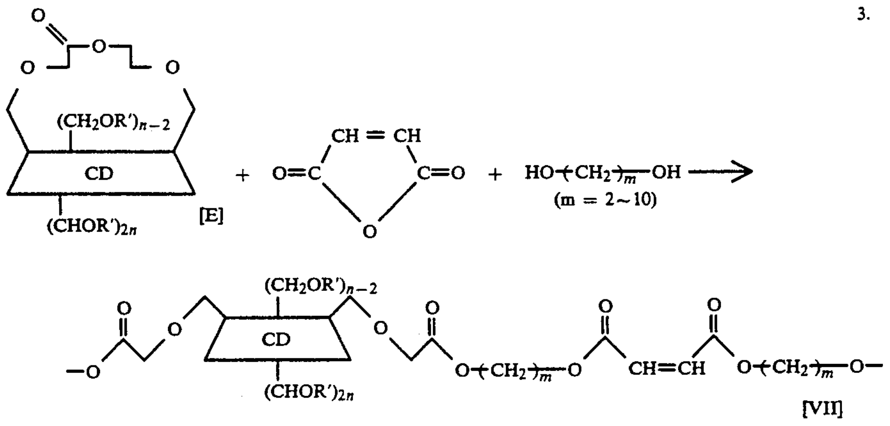
CD diol [A] may also be used as a glycol to be reacted with [E].
It should also be understood that the acid anhydride to be reacted with [E] may also be aromatic, and further that dicarboxylic acids (aliphatic, aromatic and (D)) may also be incorporated into the backbone chain.
(3) Synthesis of Polyester
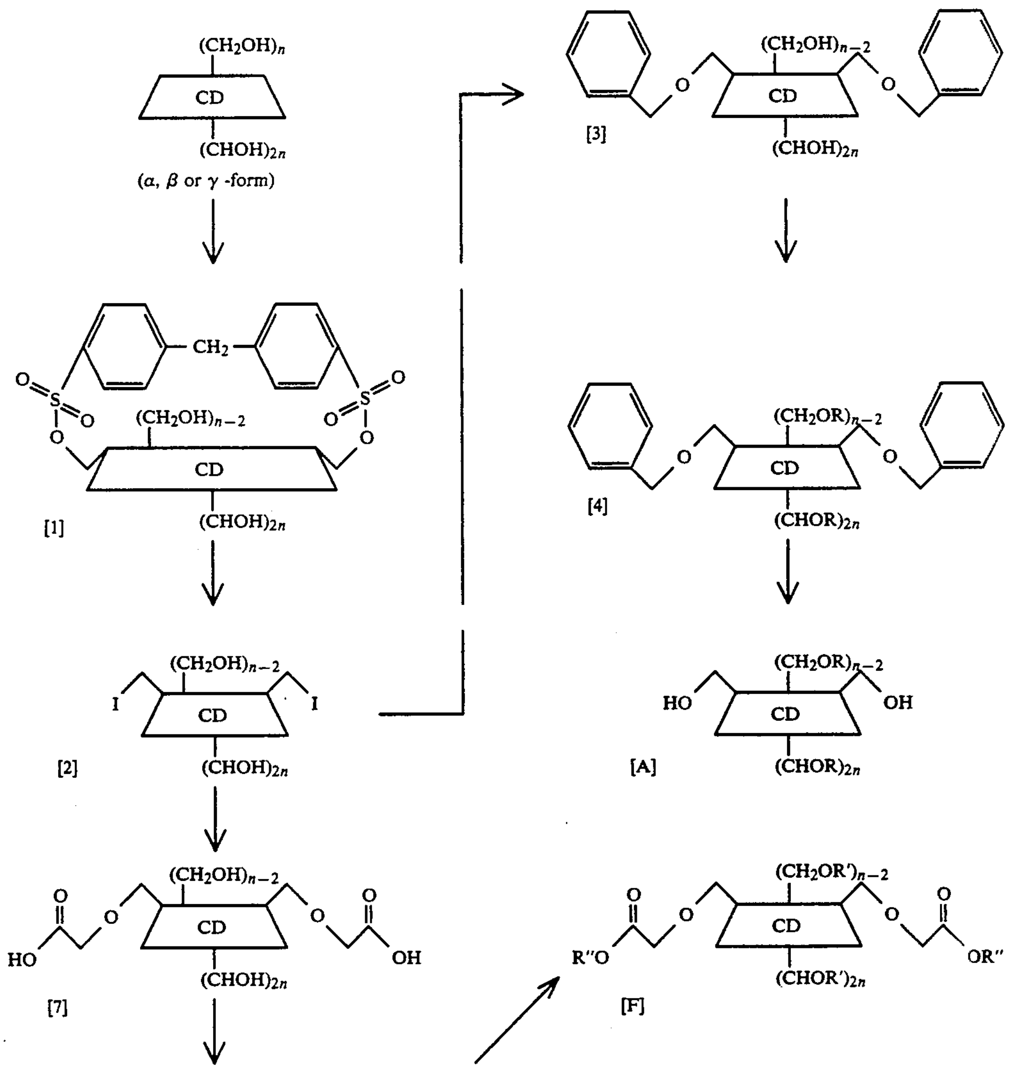

-continued

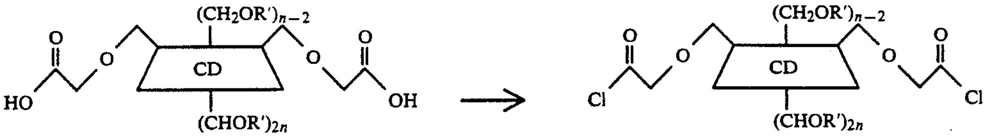

[8] [G]

1.

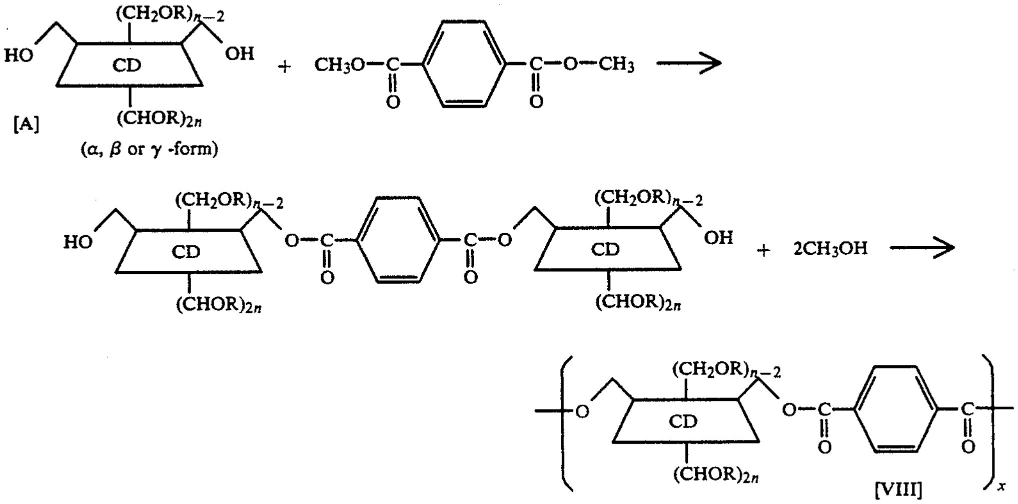

[A] (α, β or γ -form)

[VIII]

An aliphatic diester, CD diester [F], etc. may also be used as a diester to be reacted with [A].

2.

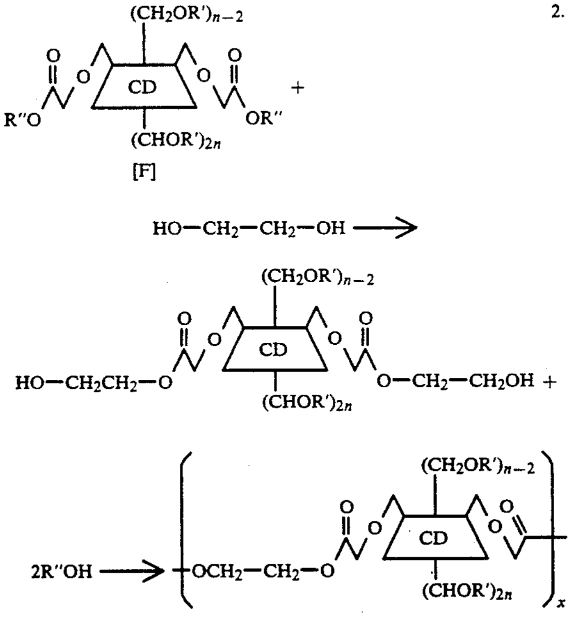

[F]

[IX]

An aromatic diol, CD diol [A], etc. may also be used as a diol to be reacted with [F].

3.

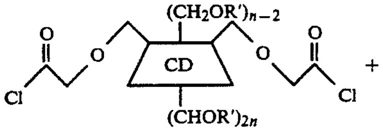

[G]

-continued

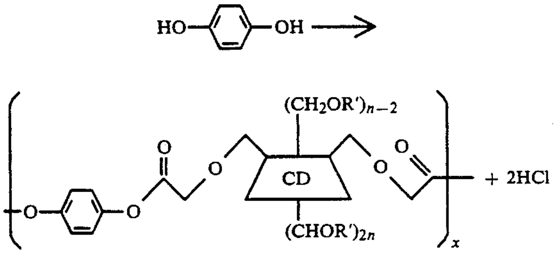

[X]

An aliphatic diol, CD diol [A], etc. may also be used as a diol to be reacted with [G].

In the reaction schemes shown above, R, R′ and n have the same meanings as defined for the reaction schemes for the synthesis of polyurethane and polyurea and R″ represents $CH_3$—,

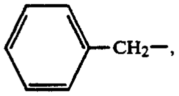

$CH_2$=CH—$CH_2$—, etc.

The procedure in (2) Synthesis of unsaturated polyester is specifically performed as follows:

i) Compound [2] is synthesized in the same manner as in the synthesis of polyurethane and polyurea.

ii) Synthesis of compound [D] (R′ is $CH_3$—C(=O)—)

Glycolic acid is reacted with NaH in DMF in a nitrogen atmosphere, and a DMF solution of Compound [2] is added to the resulting mixture at room temperature.

After the addition, the reaction is allowed to continue at 70°-80° C. for one day and after the reaction, DMF is distilled off under reduced pressure, and the residue is reprecipitated from a large volume of acetone. The precipitate is purified by recrystallization from methanol to give Compound [7] (yield: 25%).

The Compound [7] thus formed is dissolved in pyridine and acetic anhydride is added at room temperature. The mixture is stirred for 30 h. After the reaction, pyridine and acetic anhydride are distilled off under reduced pressure the residue is dissolved in a small amount of ethanol, followed by reprecipitation from a large volume of ice-cold water. The precipitate is purified by recrystallization from n-hexane/acetone to afford Compound [D] (yield: 80%).

iii) Synthesis of Compound [E]

Compound [D] is mixed with acetyl chloride, and after all portions of Compound [D] has dissolved under reflux, the mixture is allowed to react for 2-3 h. After the reaction, the mixture is left standing to cool to room temperature and, thereafter, upon cooling to 0°-5° C. with ice, crystals begin to precipitate. The crystals are collected and washed with ethyl to afford Compound [E] (yield: 80%).

The synthesis (polycondensation) of CD polymer is performed in the following manner.

1. A flask is charged with a DMSO solution of Compound [A] (n=7, R: $CH_3$—), maleic anhydride and terephthalic acid, and the mixture is gradually heated under nitrogen stream. Following stirring at 140°-150° C. for 2 h, the temperature is further raised to 170°-180° C. and the reaction is continued (for ca. 3 h) until no condensed water distilled off more.

After the reaction, the mixture is left to cool in a nitrogen stream and subjected to reprecipitation from a large volume of water. The resulting polymer is washed well with water and vacuum dried to afford Compound [V]. Alternatively, after the reaction is continued for 3 h, the temperature of the mixture may be lowered to 120°-130° C., whereupon hydroquinone and styrene are added and stirred (for ca. 2 h). By working up similarly as mentioned above, an unsaturated polyester containing styrene can be obtained.

2. A flask is charged with Compound [D] (n=7, R':

$$CH_3-\underset{\displaystyle\overset{\|}{O}}{C}-),$$

maleic anhydride and 1,3-propanediol (m=3), and the mixture is gradually heated under nitrogen stream. Following stirring at 150°-160° C. for 2 h, the temperature is further raised to 200°-210° C. and the reaction is continued (for ca. 3 h) until no distillation of condensed water is observed more.

After the reaction is complete, the resulting polymer is washed thoroughly with water and vacuum dried to afford Compound [VI].

Alternatively, after the reaction is continued for 3 h, the temperature of the mixture may be lowered to 140°-150° C., whereupon hydroquinone and styrene are added, followed by stirring (for ca. 2 h) and working up in the subsequent stage, in analogous manner to give an unsaturated polyester containing styrene.

3. A flask is charged with Compound [E] (n=7, R':

$$CH_3-\underset{\displaystyle\overset{\|}{O}}{C}-),$$

maleic anhydride and 1,3-propanediol (m=3), and the mixture is gradually heated under nitrogen stream. Following stirring at 150°-160° C. for 2 h, the temperature is further raised to 200°-210° C. and the reaction is continued until no distillation of condensed water is observed longer (ca. 3 h).

After the reaction, the resulting polymer is washed thoroughly with water and vacuum-dried to afford Compound [VII]. Alternatively, after the reaction is continued for 3 h, the temperature of the mixture may be lowered to 140°-150° C., whereupon hydroquinone and styrene are added, followed by stirring (for. ca. 2 h). Similar working up in the subsequent stage affords an unsaturated polyester containing styrene.

The procedure of (3) Synthesis of polyester as described above is performed specifically as follows:

i) Compound [2] is synthesized in the same manner as in the synthesis of polyurethane or polyurea.

ii) Synthesis of Compounds [F] and [G] (R' is $$CH_3-\underset{\displaystyle\overset{\|}{O}}{C}-)$$

Glycolic acid is reacted with NaH in DMF under nitrogen atmosphere and to the reaction mixture, solution of Compound [2] in DMF is added at room temperature. After the addition, reaction is allowed to continue at 70°-80° C. for one day. After completion of the reaction, DMF is distilled off under reduced pressure and the residue is reprecipitated from a large volume of acetone. The precipitate is purified by recrystallization from methanol to afford Compound [7] (yield: 25%).

The Compound [7] thus obtained is dissolved in pyridine, and acetic anhydride is added to the solution at room temperature and, thereafter, the mixture is stirred for 30 h. After the reaction, pyridine and acetic anhydride are distilled off and the residue is dissolved in a small amount of ethanol and reprecipitated from a large volume of ice-cold water. The precipitate is purified by recrystallization from n-hexane/acetone to give Compound [8] (yield: 80%).

In the case R" is $CH_3$—:

Compound [8] is dissolved in ether and the solution is cooled to 0° C. To the mixture, an ethereal solution of diazomethane is slowly added. Stirring is continued at that temperature until evolution of nitrogen occurrs no longer, and after the reaction, the excess diazomethane is decomposed by the addition of acetic acid. The reaction mixture is added to a large volume of methanol/water to effect reprecipitation. The resulting precipitate is dissolved in ethanol and purified by reprecipitation from a large volume of water to yield Compound [F] (yield: 55%).

Separately, Compound [8] is dissolved in benzene and reacted with thionyl chloride under reflux for 6 h. After the reaction, benzene and thionyl chloride are distilled off under reduced pressure to dryness to give Compound [G] (yield: 70%). The resulting white crystals are immediately used for the condensation reaction (because it is very labile).

The synthesis of CD polymers (polycondensation) is performed as follows:

1. (i) Compound [A]-1 or either one of Compounds [A]-2 to [A]-11 (n=7, R: $CH_3$—) obtained in (1) Synthesis of polyurethane and polyurea, and a solution of dimethyl terephthalate, calcium acetate dihydrate and antimony trioxide in DMF are charged into a polycondensation tube. The mixture is heated and nitrogen is introduced through a capillary tube that has been put in such a way that it reaches the bottom of the reaction tube. After distilling off the methanol in the mixture at 100°-120° C. for 2 h, the residue is heated at 150°-160° C. for 2 h. Then, the mixture is heated under reduced pressure for another 5 h; after the reaction, the mixture is allowed to cool under nitrogen stream. The DMF solution is reprecipitated from a large volume of water. The precipitate is washed well with water and vacuum dried to afford Polyester [VIII].

2. A mixture of Compound [F](n=7, R':

$$CH_3-\overset{\overset{\displaystyle O}{\|}}{C}-,$$

R''=$CH_3$—), ethylene glycol and isopropyl titanate are charged into a polymerization tubes. The mixture is heated and allowed to react under nitrogen introduced through a capillary which is put in such a way that it reaches the bottom of the reaction tube, at 140°-160° C. for 3 h. Then, methanol is distilled off and the reaction is allowed to continue at 180°-200° C. for 2 h, followed by gradual reduction in pressure and further reaction for 5 h. After the reaction, the mixture is left to cool under nitrogen stream and vacuum dried to give Compound [IX].

3. A flask is charged with Compound [G] (n=7, R':

$$CH_3-\overset{\overset{\displaystyle O}{\|}}{C}-),$$

hydroquinone and nitrobenzene and the mixture is allowed to react at 120°-140° C. for 8 h under nitrogen stream. After the reaction, nitrobenzene is distilled off under reduced pressure to dryness. The resulting solids are collected and vacuum dried to afford Compound [X].

(3) Synthesis of Polycarbonate, Polyamide and Polysulfone

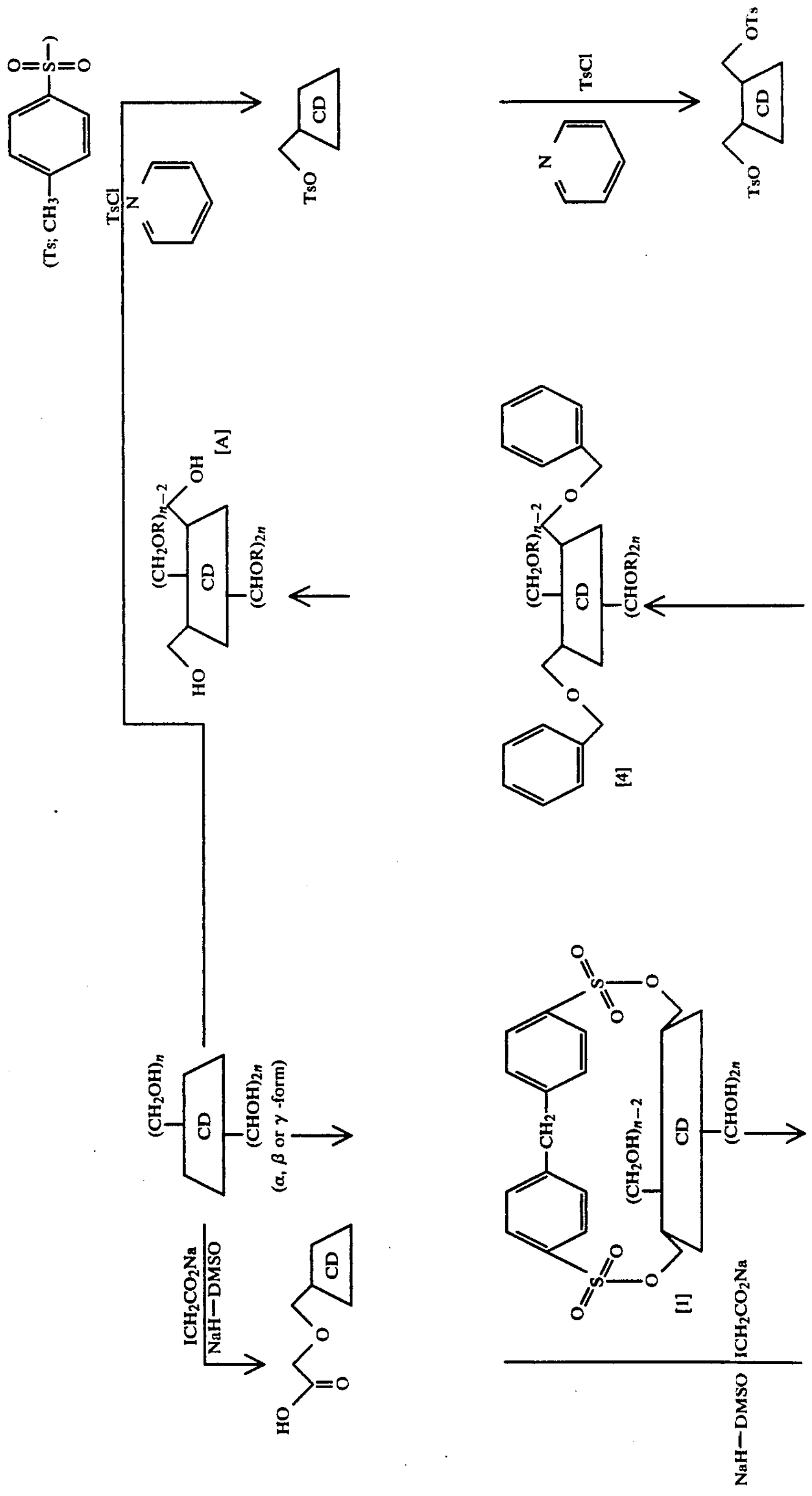
(Ts; CH3—
TsCl
TsO
CD
OTs
(CH2OR)n−2
OH
HO
(CHOR)2n
[A]
[4]
(CH2OH)n
(CHOH)2n
(α, β or γ-form)
ICH2CO2Na
NaH—DMSO
CH2
(CH2OH)n−2
[1]

-continued
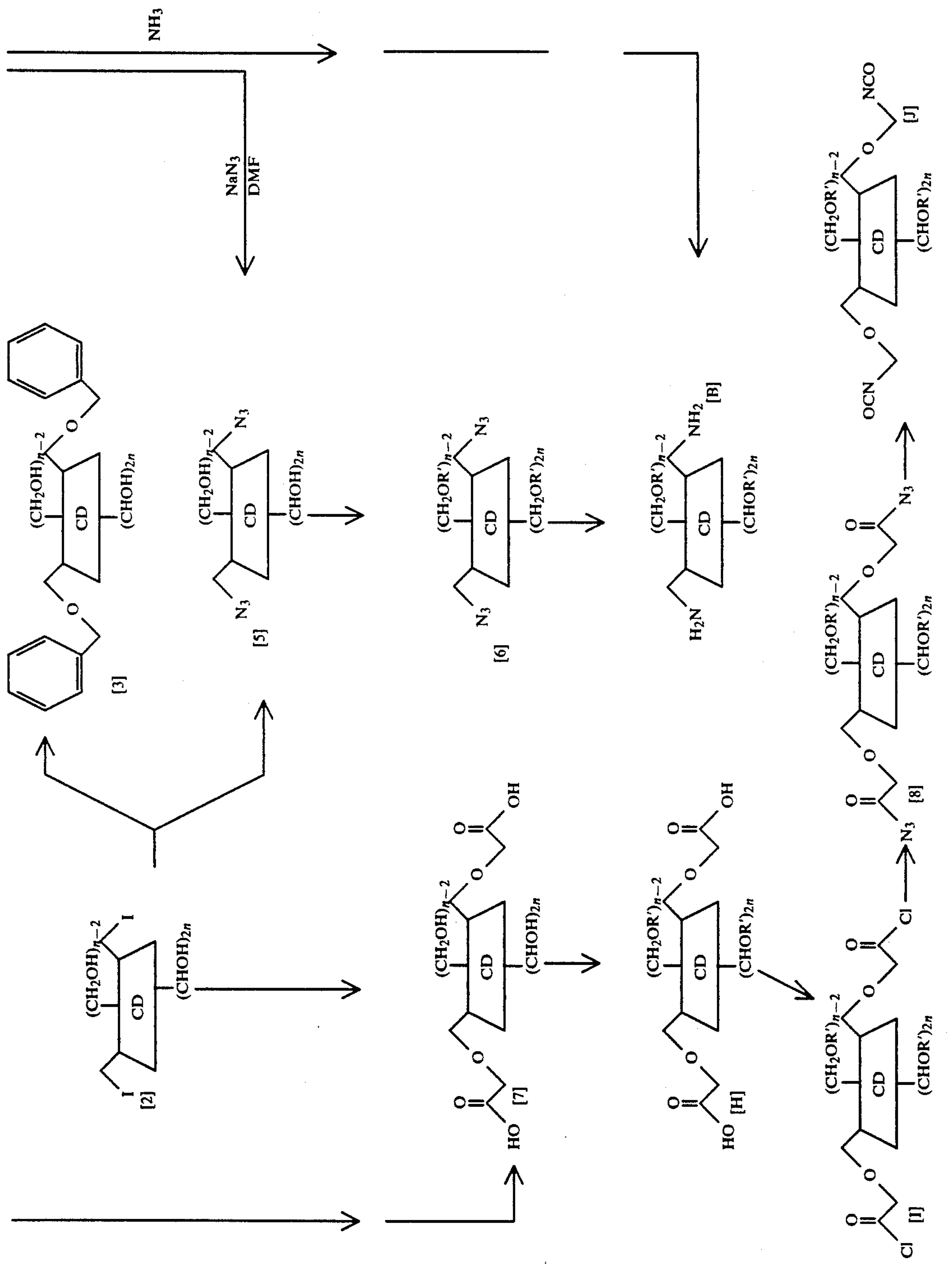
(3a) Synthesis of polycarbonate

-continued
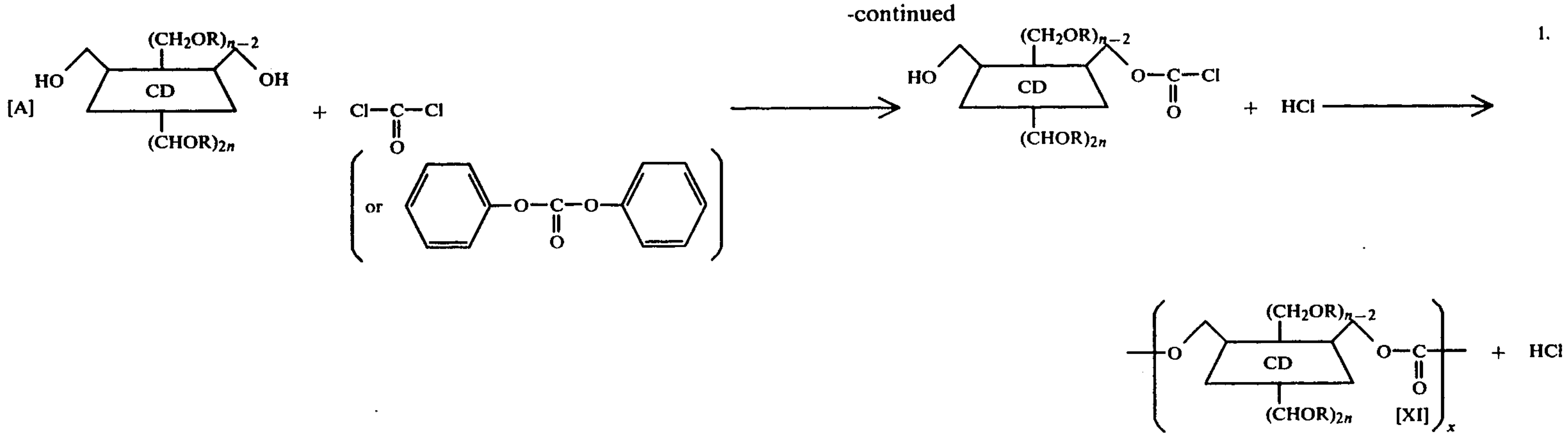
(3b) Synthesis of polyamide
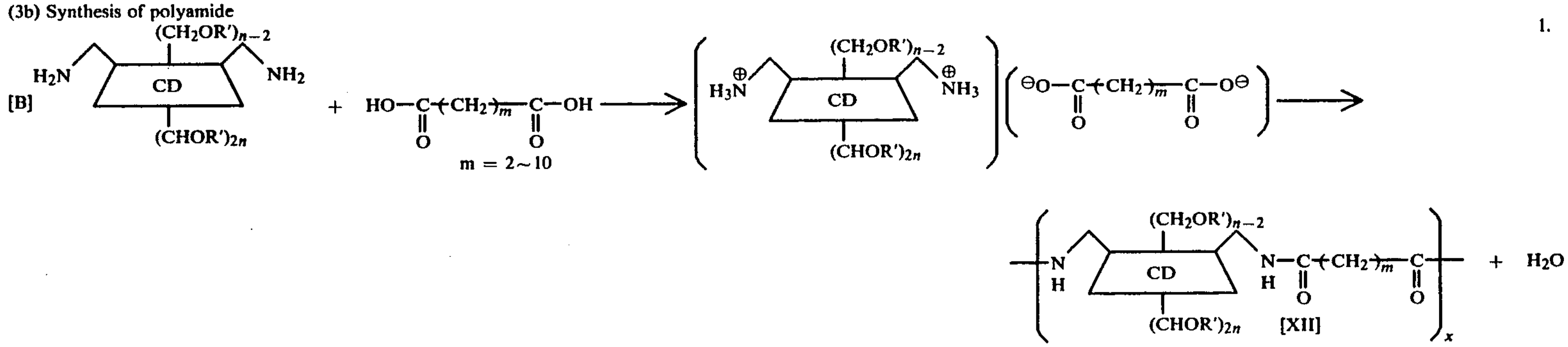

An aromatic dicarboxylic acid, CD dicarboxylic acid [H], etc. may also be used as a dicarboxylic acid to be reacted with [B].

2.

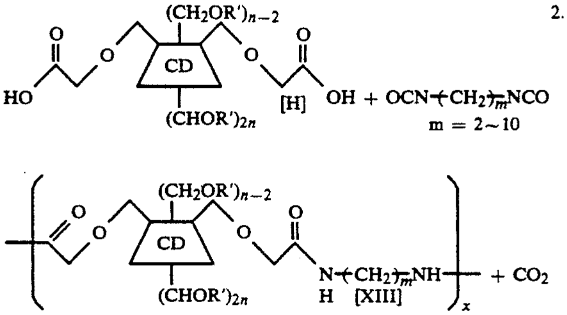

An aromatic diisocyanate, CD diisocyanate [J], etc. may also be used as a diisocyanate to be reacted with [H].

3.

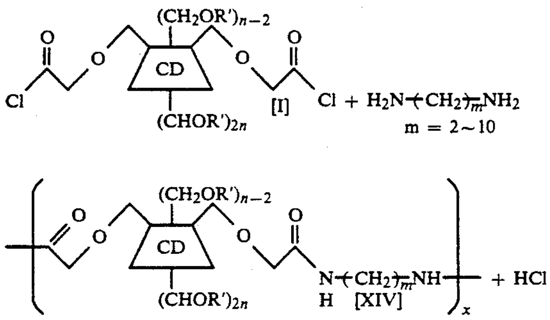

An aromatic diamine, CD diamine [B], etc. may also be used as a diamine to be reacted with [I].

4.

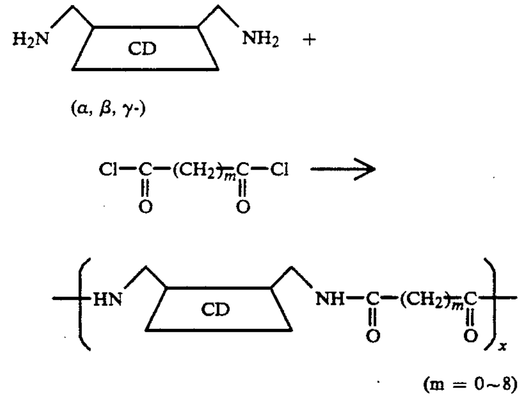

(3c) Synthesis of polysulfone

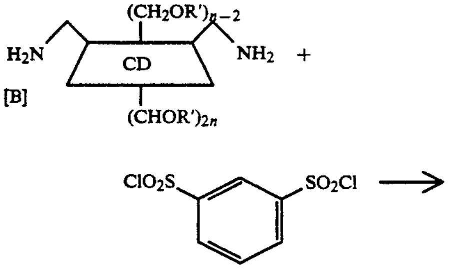

-continued

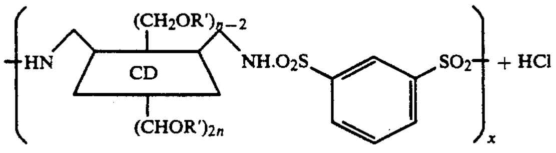

[XV]

In the reaction schemes shown above, R, R' and n have the same meanings as defined for the reaction schemes for synthesis of polyurethane and polyurea.

(3a) Synthesis of polycarbonate

The procedure for the synthesis of polyurethane and polyurea is repeated to synthesise compounds [A], [B], [H], [I] and [J].

1. Compound [A] (n=7, R: $CH_3$—) is dissolved in pyridine and the solution is stirred at 30° C. or below. Phosgene is introduced into the mixture with stirring until the yellow color of the phosgene-hydrogen chloride complex disappears. After the reaction, methanol is added to precipitate the polymer which is filtered and dried. Then, the dried product is dissolved in THF and purified by reprecipitation with methanol, and vacuum dried to yield Polycarbonate [XI]. (3b) Synthesis of polyamide 1. An ethanol solution of compound [B] (n=7, R':

$$CH_3-\underset{\underset{O}{\|}}{C}-)$$

is added to an ethanol solution of adipic acid (m=4) and the mixture is stirred for 1-2 h, Then, the reaction is discontinued and the the mixture is left standing overnight at room temperature, followed by filtration. The filter cake is washed with ethanol and vacuum dried.

The amide salt thus obtained is worked into an 80% aqueous solution and put into an autoclave. After purging with nitrogen, the autoclave is heated under agitation (for 5 h) with steam being generated at an internal temperature of 180°-200° C. and at a pressure of 15-18 kg/cm$^2$. Thereafter, the pressure is released and the internal temperature is raised to 250° C., followed by heating for further 1 h. The mixture is allowed to cool to room temperature and washed with methanol, followed by vacuum drying to give Polyamide [XII].

2. Compound [H] (n=7, R': $CH_2$=CH—$CH_2$—) and hexamethylene diisocyanate (m=6) are dissolved in xylene and the solution is charged into a polymerization tube, which is sealed after purging with nitrogen. Thereafter, reaction is allowed to occur at 100°-110° C. for 5 h, then at 150°-160° C. for 3 h. After being left standing to cool to room temperature, the reaction mixture is poured into a large volume of methanol to effect reprecipitation.

The precipitate is washed thoroughly with methanol and vacuum dried to give Polyamide [XIII].

3-1. A methylene chloride solution of Compound [I] (n=7, R': $CH_2$=CH—$CH_2$—) is added to a large volume of water containing ethylenediamine (m=2) and potassium hydroxide dissolved therein, and the mixture is vigorously agitated.

After stirring at room temperature for 30 min, the mixture is filtered and the polymer separated by filtration is placed in boiling water for removing methylene chloride adsorbed on the polymer. Following another filtration, the polymer is vacuum dried to give Polyamide [XIV].

3-2. 0.5 g of hexamethylenediamine (m=6) and 0.4 g of NaOH are dissolved in 50 ml of water and the mixture is vigorously stirred. A DMF solution of dicarboxylic acid chloride β-CD (6 g) is added to the reaction mixture dropwise. Then, the mixture is stirred at 60°-70° C. for 10 h, water and DMF are distilled off under reduced pressure, and the residue is reprecipitated in acetone and filtered. Thorough washing of the precipitate with water and drying affords a CD-polymer. The polymer thus obtained has a molecular weight of 52,000.

4. Diamino β-CD (4.5 g) and NaOH (0.4 g) are dissolved in 50 ml of water and the mixture is vigorously stirred whereupon a DMF solution of adipic acid dichloride (m=4, 0.8 g) is added dropwise. Then, the mixture is stirred at 60°-70° C. for 10 h, water and DMF are removed by distillation under reduced pressure, and the residue is reprecipitated in acetone and filtered. Thorough washing of the precipitate with water and drying affords a CD polymer. The polymer has a molecular weight of ca. 50,000.

(3c) Synthesis of polysulfone

A THF solution of Compound [B] (n=b 7, R′:

$$CH_3-\underset{\underset{O}{\|}}{C}-)$$

is mixed with distilled water, an aqueous 10% sodium laurate solution and sodium carbonate to form a uniform solution. To the mixture, a methylene chloride solution of m-benzenesulfonyl dichloride is added with stirring over a period of 5 min, followed by stirring for 30 min. Then, ethanol is added and the resulting precipitate is filtered. The precipitate is successively washed with ethanol, acetone, hot water and acetone, then vacuum dried to afford Polysulfone [XV].

Examples of CD used in the present invention include α-CD, β-CD and γ-CD.

The CD polymers of the present invention obtained as described above are insoluble in water or in certain organic solvents and yet they are decomposable with specific enzymes and therefore they can be used as degradable polymers.

Table 1 shows the degradability of CD polymers of the present invention.

TABLE 1

| Days | Polymer [V] | Polymer [VIII] | Polyethylene |
|---|---|---|---|
| 5 (days) | | | |
| 10 | | no change | |
| 15 | no change | | |
| 20 | | | |
| 25 | | a few holes | no change at all |
| 30 | | | |
| 35 | a few holes | increased holes | |
| 40 | increased holes | increased holes to reduce the area to ½ | |
| 50 | increased holes to redeuce the area to ½ | increased holes to reduce the area to ⅓ | |
| 60 | increased holes to reduce the area to ⅓ | increased holes to reduce the area to 1/5 | |

It should be mentioned here that the above results were obtained by cutting the respective polymers into 10 cm×10 cm sheets (thickness: ca. 50 μm) which were buried in the soil and checked for their states at predetermined intervals.

From the viewpoint of film-forming property, the polymers obtained by the reactions described above preferably have a molecular weight of at least 50,000.

The cyclodextrin polymers of the present invention may be processed into a membrane for use as a permeation membrane or an adsorption/separation membranes, etc., or processed into a powder or beads for use as a packing for separation columns in gas chromatography or liquid chromatography, or processed into beads or pellets for use as adsorbents, trapping agents, etc.

In the present invention, films are formed from the polymers obtained as above. While various known methods may be used for the formation of films, preferably the casting method is used.

Namely, a solution prepared by dissolving the cyclodextrin polymer of the present invention in a solvent is cast onto a support and the solvent is thereafter removed to leave a film.

For example, the polymer obtained is dissolved in dimethylformamide (DMF) or dimethyl sulfoxide (DMSO) and the resulting solution is cast onto a support such as a Teflon sheet, a glass plate or a metal plate, the solvent is then removed (e.g. evaporated) to form a membrane. Since both DMF and DMSO have a higher boiling point and do not evaporate easily, a method may be adopted in which heat of 40°-60° C. is applied and at a time point when they have evaporated to a certain extent, the support with the cast film is dipped into water, whereupon the film is removed, washed with water and dried to produce a cyclodextrin membrane.

Alternatively, an extrusion method may be used in which the cyclodextrin polymer of the present invention is melt with heating, extruded to form a film.

As described above in detail, by incorporating CD into the backbone chain of a high-molecular weight compound in accordance with the present invention, an increased amount of CD unit can be immobilized to provide CD polymers having significantly improved functions. Further, by using specific high-molecular weight compounds, CD polymers can be obtained which are insoluble in water or in certain organic solvents but which are decompsable with enzymes, thus providing a dissociable polymersuitable for use.

In addition, cyclodextrin membranes prepared using the cyclodextrin polymers of the present invention need not use any separate support membranes since the polymers themselves have a film-forming property and therefore, such membranes can be used alone as a membrane.

Field of Industrial Applicability

The CD polymers obtained as mentioned above may particularly be used as adsorbing/separating agents and, in addition, the CD membranes prepared using the CD polymers of the present invention may be used as a permeation membrane or as an adsorption/separation membrane.

I claim:

1. A cyclodextrin polymer which contains cyclodextrin in the backbone chain of a high-molecular weight compound selected from a polyurethane, a polyurea, an unsaturated polyester, a polyester, a polycarbonate, a polyamide and a polysulfone.

2. A cyclodextrin polymer as claimed in claim 1 which is synthesized using a cyclodextrin derivative having protective groups only in two of the hydroxyl groups in cyclodextrin.

3. A cyclodextrin membrane which is prepared using the cyclodextrin polymer as defined in claim 1 or 2.

* * * * *